United States Patent [19]

Kioka et al.

[11] Patent Number: 5,324,805
[45] Date of Patent: Jun. 28, 1994

[54] ETHYLENE/PENTENE-1 COPOLYMER AND ETHYLENE/PENTENE-1 COPOLYMER COMPOSITION

[75] Inventors: Mamoru Kioka; Takashi Ueda, both of Kuga; Masaya Yamada; Masaki Kohyama, both of Ichihara; Seiichi Ikeyama, Kuga; Yoshinori Akana, Kuga; Kenji Iwata, Kuga; Hiroshi Nishikawa, Kuga; Kazumitsu Kawakita, Kuga; Hideki Sakai, Kuga, all of Japan

[73] Assignee: Mitsui Petrochemical Industries, Ltd., Tokyo, Japan

[21] Appl. No.: 661,334

[22] Filed: Feb. 27, 1991

[30] Foreign Application Priority Data

| Feb. 27, 1990 | [JP] | Japan | 2-46608 |
| Mar. 8, 1990 | [JP] | Japan | 2-57283 |
| Mar. 8, 1990 | [JP] | Japan | 2-57284 |
| Mar. 9, 1990 | [JP] | Japan | 2-59618 |
| Apr. 23, 1990 | [JP] | Japan | 2-106816 |
| Apr. 23, 1990 | [JP] | Japan | 2-106817 |
| Apr. 23, 1990 | [JP] | Japan | 2-106818 |
| Apr. 23, 1990 | [JP] | Japan | 2-106819 |
| Apr. 23, 1990 | [JP] | Japan | 2-106820 |

[51] Int. Cl.$^5$ .......................... C08F 210/14
[52] U.S. Cl. .................. 526/348.6; 526/124; 526/125; 526/348; 526/901; 526/904; 524/147; 524/236; 524/323; 524/394; 524/400; 524/420; 524/579
[58] Field of Search ............ 526/348.6, 124, 125, 526/901, 904; 524/579, 147, 236, 323, 394, 420

[56] References Cited

U.S. PATENT DOCUMENTS

| 3,073,809 | 1/1963 | Kluiber et al. | 526/348.6 X |
| 3,130,188 | 4/1964 | Hogan | 526/348.6 X |
| 3,645,992 | 2/1972 | Elston | 526/169.2 |
| 4,205,021 | 5/1980 | Morita et al. | 526/348.6 X |
| 4,330,639 | 5/1982 | Matsuura et al. | 525/240 |
| 5,260,382 | 11/1993 | Kohyama et al. | 526/348.6 X |

FOREIGN PATENT DOCUMENTS

| 0100843 | 2/1984 | European Pat. Off. . |
| 0109779 | 5/1984 | European Pat. Off. . |
| 0109779 | 5/1984 | European Pat. Off. . |
| 0212142 | 3/1987 | European Pat. Off. . |
| 0235956 | 9/1987 | European Pat. Off. . |
| 0256724 | 2/1988 | European Pat. Off. . |
| 0351189 | 1/1990 | European Pat. Off. . |

*Primary Examiner*—Fred Teskin
*Attorney, Agent, or Firm*—Sherman and Shalloway

[57] ABSTRACT

The present invention relates to a novel ethylene/pentene-1 copolymer whose molded film has a good balance between impact resistance and tear properties and high transparency, also is prominently reduced in a variation of the transparency even after subjected to a heat treatment, and further shows high blocking resistance, provided that the copolymer fulfills specific requisites. The invention also relates to a process for the preparation of the above-mentioned ethylene/pentene-1 copolymer and a formulation of the ethylene/pentene-1 copolymer composition using a stabilizer. According to the invention, there can be obtained an ethylene/pentene-1 copolymer composition which is excellent in heat stability in the molding stage, long-term heat stability and weatherability.

47 Claims, 3 Drawing Sheets

ETHYLENE/PENTENE-1 COPOLYMER AND ETHYLENE/PENTENE-1 COPOLYMER COMPOSITION

FIELD OF THE INVENTION

The present invention relates to an ethylene/pentene-1 copolymer and a process for the preparation of the same. More particularly, the invention relates to a novel ethylene/pentene-1 copolymer whose molded film has a good balance between impact resistance and tear properties. The invention also relates to a process for the preparation of the above-described ethylene/pentene-1 copolymer.

Further, the present invention relates to an ethylene/pentene-1 copolymer composition, more particularly, to an ethylene/pentene-1 copolymer composition which is excellent in heat stability in the molding stage, long-term heat stability and weatherability.

BACKGROUND OF THE INVENTION

Linear low-density polyethylene (LLDPE), that is a copolymer of ethylene and α-olefin, shows higher impact strength when molded into a film, as compared with conventional low-density polyethylene (LDPE) obtained by the high pressure process, so that the linear low-density polyethylene has been broadly used as a film-forming material.

In order to prepare such ethylene/α-olefin copolymer, there have been used butene-1 or α-olefin having 6 or more carbon atoms as α-olefin comonomer.

A film obtained from an ethylene/butene-1 copolymer (i.e., an example of the linear low-density polyethylenes) is excellent in tear properties because of its adequate tear strength, but is somewhat low in the impact strength.

A film obtained from a copolymer of ethylene and α-olefin having 6 or more carbon atoms (i.e., other example of the linear low-density polyethylene) is excellent in the impact strength, but has such a problem that the film cannot be easily torn because of too high tear strength. In other words, the film obtained from such copolymer is bad in the tear properties.

Accordingly, eagerly desired are ethylene/α-olefin copolymers which can provide films of high impact strength and excellent tear properties.

The present inventors have earnestly studied to solve the above-mentioned problems accompanied by the ethylene/α-olefin copolymer films. As a result, they have found that if an ethylene/pentene-1 copolymer having been obtained by copolymerizing ethylene and pentene-1 and fulfilling specific requisites is molded into a film, the resulting film is excellent in impact strength and tear properties. Thus, ethylene/pentene-1 copolymers and processes for the preparation of the same according to the invention have been accomplished.

The present inventors have also found that an ethylene/pentene-1 copolymer composition obtained by adding a specific stabilizer to the above-mentioned ethylene/pentene-1 copolymer is excellent in heat stability in the molding stage, long-term heat stability and weatherability, and that a molded product obtained from the copolymer composition can keep high impact strength and good tear properties both inherently belonging to the ethylene/pentene-1 copolymer. Thus, ethylene/pentene-1 copolymer compositions according to the invention have been accomplished.

OBJECT OF THE INVENTION

The present invention is to solve the above-mentioned problems existing in the prior arts, and it is an object of the invention is to provide an ethylene/pentene-1 copolymer whose molded film has a good impact strength and tear properties.

It is another object of the invention to provide a process for the preparation of the above-mentioned ethylene/pentene-1 copolymer.

It is a further object of the invention to provide an ethylene/pentene-1 copolymer composition having high heat stability in the molding stage, excellent long-term heat stability and high weatherability, which is very suitable for forming a molded product capable of keeping high impact strength and excellent tear properties both inherently belonging to the ethylene/pentene-1 copolymer.

SUMMARY OF THE INVENTION

The first ethylene/pentene-1 copolymer of the present invention obtained by copolymerization of ethylene and pentene-1 is characterized by satisfying the following requirements (A)–(E).

(A) A melt flow rate of the copolymer as measured according to ASTM D 1238E is 0.01–100 g/10 min,
(B) a density of the copolymer as measured according to ASTM D 1505 is 0.87–0.96 g/cm$^3$,
(C) the copolymer contains constitution unit derived from pentene-1 is 1–25% by weight, and
(D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer, (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

The second ethylene/pentene-1 copolymer of the invention obtained by vapor phase copolymerization of ethylene and pentene-1 is characterized by satisfying the following requirements (A)–(E).

(A) A melt flow rate of the copolymer as measured according to ASTM D 1238E is 0.01–100 g/10 min,
(B) a density of the copolymer as measured according to ASTM D 1505 is 0.88–0.95 g/cm$^3$, (C) the copolymer contains constitution unit derived from pentene-1 is 2-25% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

The third ethylene/pentene-1 copolymer of the invention obtained by suspension copolymerization of ethylene and pentene-1 is characterized by satisfying the following requirements (A)-(E).

(A) A melt flow rate of the copolymer as measured according to ASTM D 1238E is 0.01-100 g/10 min, (B) a density of the copolymer as measured according to ASTM D 1505 is 0.90-0.96 g/cm$^3$, (C) the copolymer contains constitution unit derived from pentene-1 is 2-15% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

The first process for the preparation of an ethylene/pentene-1 copolymer comprises copolymerizing ethylene and pentene-1 in the presence of a catalyst containing solid catalyst components, wherein the ethylene/pentene-1 copolymer obtained satisfies the following requirements (B)-(D).

(B) a density of the copolymer as measured according to ASTM D 1505 is 0.87-0.96 g/cm$^3$, (C) the copolymer contains constitution unit derived from pentene-1 is 1-25% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer.

In accordance with the first process for the preparation of an ethylene/pentene-1 copolymer, there may be obtained the ethylene/pentene-1 copolymer satisfying the specific requirements as mentioned above in high yield, and a film molded out of this copolymer is found to be excellent in balance between impact resistance and tearability.

The second process for the preparation of ethylene/pentene-1 copolymer according to the invention comprises copolymerizing ethylene and pentene-1 by vapor phase copolymerization in the presence of a catalyst containing solid catalyst component, wherein the ethylene/pentene-1 copolymer obtained satisfies the following requirements (B)-(D).

(B) a density of the copolymer as measured according to ASTM D 1505 is 0.88-0.95 g/cm$^3$, (C) the copolymer contains constitution unit derived from pentene-1 is 2-25% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer.

In accordance with the second process for the preparation of an ethylene/pentene-1 copolymer, there may be obtained the ethylene/pentene-1 copolymer satisfying the specific requirements as mentioned above in high yield, and a film molded out of this copolymer is found to be excellent in balance between impact resistance and tearability.

The third process for the preparation of an ethylene/pentene-1 copolymer according to the invention comprises copolymerizing ethylene and pentene-1 in a suspension state in the presence of a catalyst containing solid catalyst component, wherein the polymerization is carried out at a state where more than 30% by weight of the resulting copolymer is not eluted and a polymerization temperature of 0°-120° C. to prepare, and the copolymer obtained satisfies the following requirements (B)-(D).

(B) a density of the copolymer as measured according to ASTM D 1505 is 0.90-0.96 g/cm$^3$, (C) the copolymer contains constitution unit derived from pentene-1 is 2-15% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer.

In accordance with the third process of the preparation of an ethylene/pentene-1 copolymer, there may be obtained the ethylene/pentene-1 copolymer satisfying the specific requirements as mentioned above, because the copolymer is carried out under specific conditions, and a film molded out of this copolymer is found to be excellent in balance between impact resistance and tearability.

The ethylene/pentene-1 copolymer compositions of the invention are characterized by comprising (I) an ethylene/pentene-1 copolymer obtained by copolymerization of ethylene and pentene-1, said copolymer satisfying the following requirements (A)-(E).

(A) A melt flow rate of the copolymer as measured according to ASTM D 1238E is 0.01-100 g/10 min, (B) a density of the copolymer as measured according to ASTM D 1505 is 0.87-0.96 g/cm$^3$, (C) the copolymer contains constitution unit derived from pentene-1 is 1-25% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer, and (II) at least one compound selected from the group consisting of the following (a)-(e).

(a) Phenolic stabilizer, (b) organic phosphite stabilizer,
(c) thioether stabilizer,
(d) hindered amine stabilizer, and
(e) metal salt of higher aliphatic acid.

DETAILED DESCRIPTION OF THE INVENTION

Figure 1:
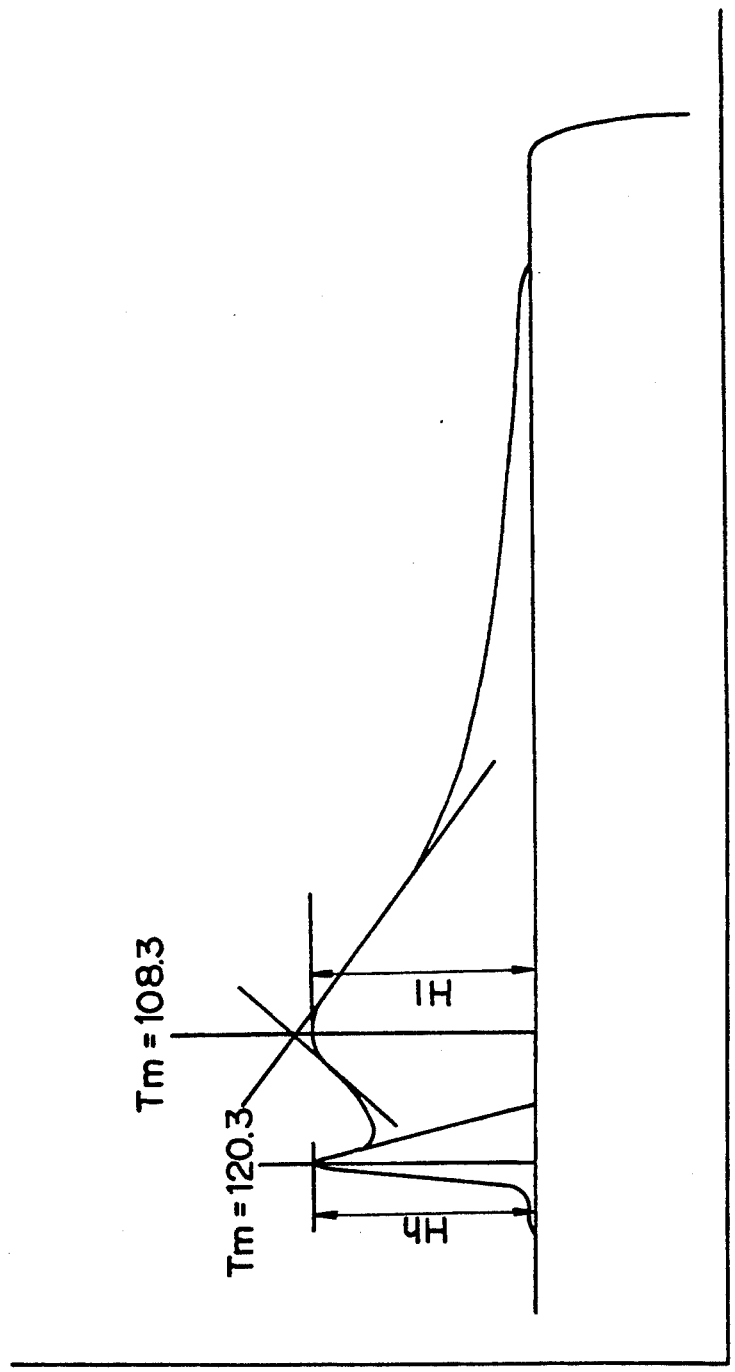
FIG. 1 is a DSC melt-peak pattern obtained by measuring "ultra-slowly cooled sample" of an ethylene/pentene-1 copolymer of the invention under conventional measuring conditions.

The present invention is illustrated below in more detail.

The first ethylene/pentene-1 copolymers of the present invention are random copolymers which can be obtained by copolymerizing ethylene and pentene-1 under specific conditions. In the preparation of the ethylene/pentene-1 copolymers of the present invention, small amounts of other α-olefins or polyenes in addition to ethylene and pentene-1 may be copolymerized. Examples of such α-olefins include propylene, 2-methylpropylene, 1-butene, 1-hexene, 4-methyl-1-pentene, 3-methyl-1-pentene, 1-octene, 1-nonene, 1-decene, 1-undecene and 1-dodecene. Examples of the polyenes include butadiene, isoprene, 1,4-hexadiene, dicyclopentadiene and 5-ethylidene-2-norbornene.

The first ethylene/pentene-1 copolymers of the present invention have a melt flow rate (MFR) of 0.01 to 100 g/10 min, preferably 0.05 to 50 g/10 min as measured according to ASTM D 1238E. When MFR is lower than 0.01 g/10 min, the moldability of the resulting copolymers is lowered and the transparency of films obtained from the copolymers is liable to be lowered, while when MFR is higher than 100 g/10 min, mechanical strength is apt to be lowered.

The first ethylene/pentene-1 copolymers of the present invention have a density of 0.87 to 0.96 g/cm$^3$, preferably 0.88 to 0.94 g/cm$^3$ as measured according to ASTM D 1505.

The first ethylene/pentene-1 copolymers of the present invention comprise 1 to 25% by weight, preferably 4 to 23% by weight, particularly preferably 6 to 20% by weight of a constitution unit derived from pentene-1 and 75 to 99% by weight, preferably 77 to 96% by weight, particularly preferably 80 to 94% by weight of a constitution unit derived from ethylene.

The ethylene/pentene-1 copolymers may contain not more than 10% by weight, preferably not more than 5% by weight, particularly preferably not more than 3% by weight of a constitution unit derived from one or more α-olefins or polyenes in addition to ethylene and pentene-1 as mentioned above.

Figure 2:
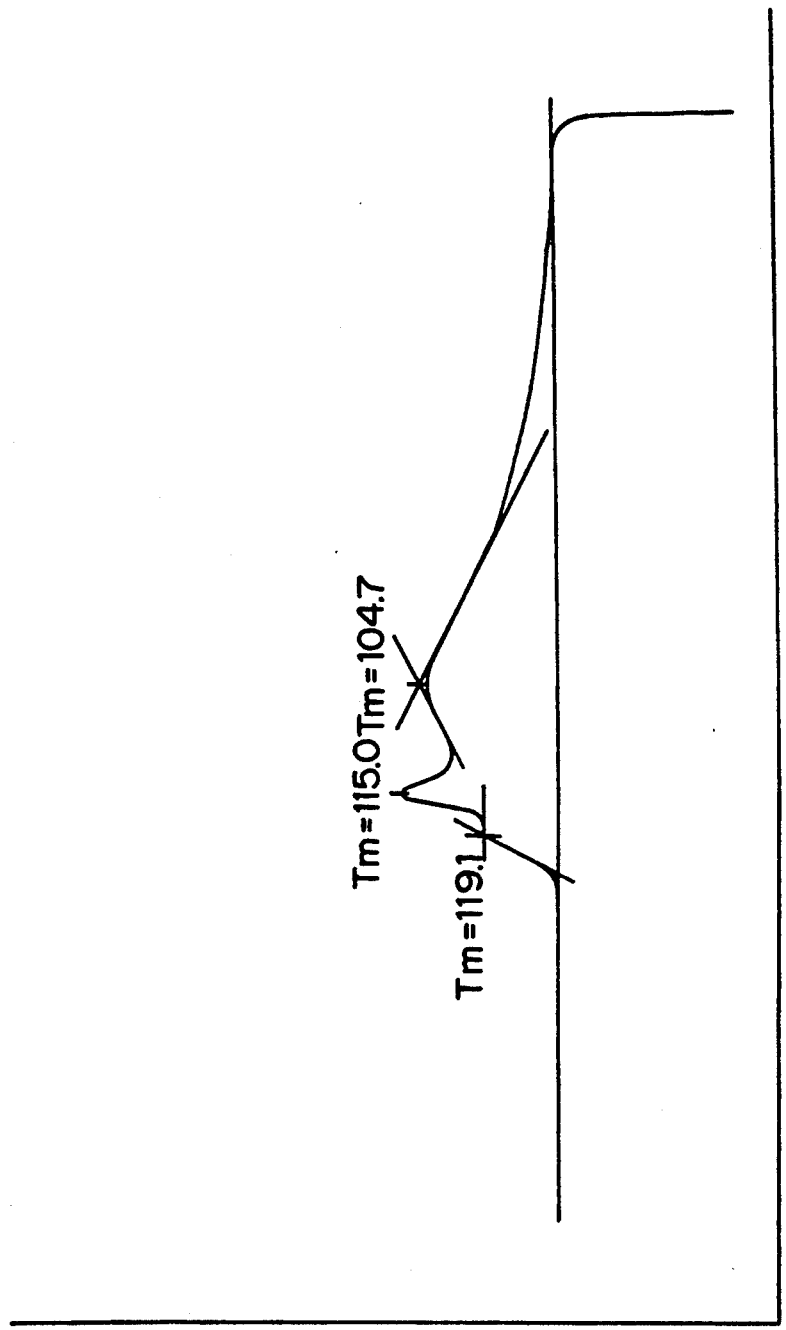
FIG. 2 is a DSC melt-peak pattern obtained by measuring conventionally cooled sample of an ethylene/pentene-1 copolymer of the invention under conventional measuring conditions.

The ethylene/pentene-1 copolymer of the present invention was molten by elevating the temperature to 200° C. and crystallized by cooling it at a cooling rate of 10° C./min to obtain a sheet of 0.5 mm in thickness as a sample. The DSC melt-peak pattern of the sheet obtained by elevating the temperature from 10° C. to 200° C. at a heating rate of 10° C./min by using DSC shows three peaks (FIG. 2). On the other hand, the ethylene/pentene-1 copolymer of the present invention was molten by elevating the temperature to 200° C. and then crystallized by ultra-slowly cooling it at a cooling rate of 0.31° C./min to 50° C. to obtain a sheet of 0.5 mm in thickness as a sample (the thus-obtained sample is hereinafter referred as ultra-slowly cooled sample). The DSC melt-peak pattern of the sheet obtained by elevating the temperature from 10° C. to 200° C. at a heating rate of 10° C./min by using DSC has two melt-peaks wherein the relationship between the ratio of Hh/Hl (wherein Hh is a peak height on the higher temperature side and Hl is a peak height on the lower temperature side) and the density (d) of the copolymer fulfills the following formula [1] (FIG. 1).

$$60d - 52.0 < Hh/Hl < 80d - 69.0 \qquad [1]$$

Preferably, $$60d - 52.0 < Hh/Hl < 80d - 69.1 \qquad [1']$$

Particularly preferably, $$60d - 51.9 < Hh/Hl < 80d - 69.2 \qquad [1'']$$

wherein Hh represents a peak height on the higher temperature side, Hl represents a peak height on the lower temperature side, and d is the density of the copolymer.

The analysis of the DSC melt-peak pattern of the ultraslowly cooled sample is made in the following manner. A tangent line is drawn on the foot of the higher temperature side of the melt-peak on the higher temperature side by starting from a point on the melt curve at 30° C. The tangent line is referred to as a base line. A perpendicular line is drawn from the highest point of the peak toward the base line, and the distance between the intersecting point and the highest point of the peak is referred to as the peak height.

The ratio (RS) of the impact strength of a film of 40 μm in thickness to the tear strength thereof in the take-off direction is represented by the following formula [2], said film being obtained by casting the first ethylene/pentene-1 copolymer having the above-mentioned characteristics according to the present invention.

$$RS \geq -20 \log MFR - 1000d + 968 \qquad [2]$$

wherein MFR is the melt flow rate of the copolymer and d is the density of the copolymer.
Preferably, $$RS \geq -20 \log MFR - 1000d + 973 \qquad [2']$$

Particularly preferably, $$200 \geq RS \geq -20 \log MFR - 1000d + 975 \qquad [2'']$$

When the ratio (RS) of the impact strength to the tear strength is lower than $(-20 \log MFR - 1000d + 968)$, the resulting film has poor tear properties, though it has a high impact strength, or the resulting film is inferior in impact strength, though it has good tear properties. The film of 40 μm in thickness, used for the measurement of the RS value, is a film prepared by molding the ethylene-pentene-1 copolymer under the following conditions into a film by using a T-die film molding machine equipped with a 65 mmΦ extruder.

Molding conditions:
Resin temperature: 220° to 240° C.
Chill roll temperature: 30° to 40° C.
Film-forming rate: 20 to 40 m/min
Draft ratio (film thickness/lip opening): 0.05 to 0.07

The cast film of 40 μm in thickness, obtained by processing the copolymer of the present invention in the manner mentioned above has an impact strength of generally not lower than 1000 kg·cm/cm, preferably not lower than 1200 kg·cm/cm.

It is preferred that the tear strength ($T_{MD}$) of said film in the take-off direction and the melt flow rate (MFR) of the ethylene/pentene-1 copolymer fulfills the relationship represented by the following formula [3].

$$\log T_{MD} \geq -0.37 \log MFR - 5.1d + 6.72 \qquad [3]$$

wherein d is the density of the copolymer.
Preferably, $$\log T_{MD} \geq -0.37 \log MFR - 5.1d + 6.65 \qquad [3']$$

Particularly preferably, $$\log T_{MD} \geq -0.37 \log MFR - 5.1d + 6.59 \qquad [3'']$$

Films excellent in impact strength as well as tear properties can be obtained from the ethylene/pentene-1 copolymers which fulfills the relationship represented by the above formula [3] with respect to the tear strength ($T_{MD}$) of the film in the take-off direction and MFR.

Pressed sheets of 2 mm in thickness obtained by molding the ethylene/pentene-1 copolymers of the present invention as mentioned above according to ASTM D 1928 have stress cracking resistance [SC resistance (ESCR), measured according to ASTM D 1692, antalocks 100%, 50° C.] of at least 10 hr and satisfy the relationship represented by the following formula [4-a].

$$ESCR \geq 0.7 \times 10^4 (\log 80 - \log MFR)^3 (0.952 - d) \qquad [4\text{-}a]$$

wherein $2.0 \leq MFR \leq 50$ and d is the density of the copolymer.
Preferably, $$ESCR \geq 0.9 \times 10^4 (\log 80 - \log MFR)^3 (0.952 - d) \qquad [4'\text{-}a]$$

Particularly, $$ESCR \geq 1.1 \times 10^4 (\log 80 - \log MFR)^3 (0.952 - d) \qquad [4''\text{-}a]$$

Further, pressed sheets of 2 mm in thickness, obtained by molding the ethylene/pentene-1 copolymers of the present invention according to ASTM D 1928 have stress cracking resistance [SC resistance (ESCR), measured according to ASTM D 1692, antalocks 10%, 50° C.] of at least 20 hr and satisfy the relationship represented by the following formula [4-b].

$$ESCR \geq 1.4 \times 10^4 (\log 40 - \log MFR)^2 (0.952 - d) \qquad [4\text{-}b]$$

wherein $1.0 \leq MFR \leq 20$ and d is the density of the copolymer.
Preferably, $$ESCR \geq 1.7 \times 10^4 (\log 40 - \log MFR)^2 (0.952 - d) \qquad [4'\text{-}b]$$

Particularly preferably, $$ESCR \geq 2.0 \times 10^4 (\log 40 - \log MFR)^2(0.952 - d) \quad [4''\text{-a}]$$

Furthermore, pressed sheets of 2 mm in thickness, obtained by molding the ethylene/pentene-1 copolymers of the present invention according to ASTM D 1928 have stress cracking resistance [SC resistance (ESCR), measured according to ASTM D 1692, antalocks 10%, 60° C.] of at least 50 hr and satisfy the relationship represented by the following formula [4-c].

$$ESCR \geq 0.50 \times 10^4 (\log 100 - \log MFR)(0.952 - d) \quad [4\text{-c}]$$

wherein $0.1 \leq MFR \leq 5$ and d is the density of the copolymer.
Preferably, $$ESCR \geq 0.65 \times 10^4 (\log 100 - \log MFR)(0.952 - d) \quad [4'\text{-c}]$$

Particularly preferably, $$ESCR \geq 0.80 \times 10^4 (\log 100 - \log MFR)(0.952 - d) \quad [4''\text{-c}]$$

Moreover, it is preferred that the haze of the above-mentioned pressed sheets and the melt flow rate (MFR) of the ethylene/pentene-1 copolymers satisfy the relationship represented by the following formula [5].

$$\log HAZE \leq 15d - 0.45 \log MFR - 12.23 \quad [5]$$

wherein d is the density of the copolymer.
More preferably, $$\log HAZE \leq 15d - 0.45 \log MFR - 12.26 \quad [5']$$

Particularly preferably, $$\log HAZE \leq 15d - 0.45 \log MFR - 12.30 \quad [5'']$$

The press sheets of 2 mm in thickness, used for the measurements of the above-mentioned physical properties were prepared from the ethylene/pentene-1 copolymers according to ASTM D 1928.

The measurement of HAZE was made according to ASTM D 1003.

The ethylene/pentene-1 copolymer whose pressed sheet satisfies the above mentioned relations between stress cracking resistance and haze are capable for giving molded articles, by injection molding, rotation molding or inflation molding which are transparent and hardly arise a environmental stress craking, that is hardly arise the trouble of content leakage.

The first ethylene/pentene-1 copolymer of the present invention mentioned above may be prepared by the first process for the preparation of an ethylene/pentene-1 copolymer of the invention as will be mentioned hereinafter.

In the first process for the preparation of an ethylene/pentene-1 copolymer of the invention, ethylene and pentene-1 are copolymerized, for example, in the presence of such olefin polymerization catalysts as mentioned below.

The olefin polymerization catalysts used in the first process for the preparation of an ethylene/pentene-1 copolymer of the invention are, for example, those disclosed by the present applicant in Japanese Patent L-O-P Publn. No. 811/1981. That is, the disclosed olefin polymerization catalysts contain

[A] a solid titanium catalyst component containing magnesium, titanium, halogen and an electron donor as its essential ingredients obtained by bringing (i) a liquid magnesium compound having no reducing ability and (ii) a liquid titanium compound into contact, as they are, with each other in the presence of (iii) an electron donor having no active hydrogen, or by bringing said (i) and said (ii) into contact, as they are, with each other, followed by contact with said (iii), and

[B] an organic compound catalyst component of a metal belonging to the Groups I to III of the periodic table.

The magnesium compounds having no reducing ability referred to herein, that is, magnesium compounds having no magnesium-carbon bond or no magnesium-hydrogen bond, which are used in the preparation of the solid titanium catalyst component [A] as mentioned above, may be those derived from magnesium compounds having reducing ability. Concrete examples of such magnesium compounds having no reducing ability as mentioned above include halogenated magnesium such as magnesium chloride, magnesium bromide, magnesium iodide or magnesium fluoride;

alkoxymagnesium halide such as methoxy magnesium chloride, ethoxy magnesium chloride, isopropoxy magnesium chloride, butoxy magnesium chloride or octoxy magnesium chloride;

aryloxy magnesium halide such as phenoxy magnesium chloride or methylphenoxy magnesium chloride;

alkoxy magnesium such as ethoxy magnesium, isopropoxy magnesium, butoxy magnesium, n-octoxy magnesium or 2-ethylhexoxy magnesium;

aryloxy magnesium such as phenoxy magnesium or dimethylphenoxy magnesium; and magnesoum carboxylate such as magnesium laurate or magnesium stearate.

The magnesium compounds having no reducing ability exemplified above may be those derived from magnesium compounds having reducing ability or those derived at the time of preparation of catalyst component. The magnesium compounds having no reducing ability may be derived from the magnesium compounds having reducing ability, for example, by bringing said magnesium compounds having reducing ability into contact with polysiloxane compounds, halogen containing silane compounds, halogen containing aluminum compounds or compounds such as esters, alcohols, etc.

The magnesium compounds having reducing ability as referred to herein may include, for example, those having a magnesium-carbon bond or magnesium-hydrogen bond. Concrete examples of such magnesium compounds as having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butyl ethoxy magnesium, ethyl butyl magnesium, octyl butyl magnesium, butylmagnesium halide, etc.

Besides the above-exemplified magnesium compounds having reducing ability or having no reducing ability, the magnesium compounds used in the present invention may also be complex or composite compounds of the above-exemplified magnesium compounds with other metals, or mixtures thereof. Further, the magnesium compounds used herein may also be mixtures of two or more of these compounds as mentioned above.

Of these magnesium compounds exemplified above, preferred are those having no reducing ability, particularly halogen containing magnesium compounds. Of the halogen containing magnesium compounds, preferred are magnesium chloride, alkoxy magnesium chloride and aryloxy magnesium chloride.

The liquid magnesium compound (i) used in the preparation of the solid titanium catalyst component [A] is suitably a solution of the magnesium compound having no reducing ability in a hydrocarbon solvent, electron donor or a mixture thereof in which said magnesium compound is soluble. The hydrocarbon solvent used for preparing the liquid magnesium compound mentioned above includes aliphatic hydrocarbons such as pentane, hexane, heptane, octane, decane, dodecane, tetradecane, kerosine, etc.;

alicyclic hydrocarbons such as cyclopentane, methylcyclopentane, cyclohexane, cyclooctane, cyclohexene, etc.;

aromatic hydrocarbons such as benzene, toluene, xylene, ethylbenzene, cumene, cymene, etc.; and halogenated hydrocarbons such as dichloroethane, dichloropropane, trichloroethylene, carbon tetrachloride, chlorobenzene, etc.

The solution of the magnesium compound in the hydrocarbon solvent as mentioned above may be obtained by various methods, though they vary according to the kind of the magnesium compound and of the solvent used, for example, a method in which the magnesium compound is mixed simply with the solvent, a method in which a mixture of the magnesium compound and the solvent is heated, and a method in which the magnesium compound is added to an electron donor in which said magnesium compound is soluble, for example, alcohol, aldehyde, amine or carboxylic acid, any mixture thereof, or said mixture with other electron donor, followed by heating if necessary. For example, when a halogen containing magnesium compound is dissolved in a hydrocarbon solvent, alcohol is used in an amount of more than 1 mole, preferably from about 1 to about 20 moles and especially from about 1.5 to about 12 moles per mole of the halogen containing magnesium compound used, though the amount of alcohol used varies according to the kind and amount of the hydrocarbon solvent used and to the kind of the magnesium compound used. When aliphatic hydrocarbons and/or alicyclic hydrocarbons are used as the hydrocarbon solvents, alcohol is used in the proportion as defined above. In that case, it is particularly preferable to use alcohol of 6 or more carbon atoms in an amount of more than about 1 mole, preferably more than about 1.5 moles per mole of the halogen containing magnesium compound used, because the halogen containing magnesium compound can be solubilized by the use of a relatively small amount of the alcohol, and the resulting catalyst component is found to be high in catalytic activity. In that case, when alcohol of not more than 5 carbon atoms is used alone, it is necessary to use more than about 15 moles of the alcohol per mole of the halogen containing magnesium compound used, and the catalytic activity of the resulting catalyst component is inferior to that attained in the system mentioned above. On the one hand, when aromatic hydrocarbons are used as the hydrocarbon solvents, it is possible to solubilize the halogen containing magnesium compound by the use of alcohol in the amount as defined above, irrespective of the kind of alcohol used.

Contact between the halogen containing magnesium compound and alcohol is preferably effected in the hydrocarbon solvent at a temperature of usually above room temperature and, according to the kind of the hydrocarbon solvent used, at a temperature of higher than about 65° C., preferably about 80° to about 300° C. and especially about 100° to about 200° C. for a period of from 15 minutes to 5 hours, preferably from 30 minutes to 2 hours. Preferred alcohols having not less than 6 carbon atoms include, for example, aliphatic alcohols such as 2-methylpentanol, 2-ethylbutanol, n-heptanol, n-octanol, 2-ethylhexanol, decanol, dodecanol, tetradecyl alcohol, undecenol, oleyl alcohol and stearyl alcohol;

aromatic alcohols such as benzyl alcohol, methylbenzyl alcohol, isopropylbenzyl alcohol, α-methylbenzyl alcohol and α,α-dimethylbenzyl alcohol;

and aliphatic alcohols containing alkoxy group such as n-butyl cellosolve or 1-butoxy-2-propanol.

Examples of other alcohols include those having not more than 5 carbon atoms such as methanol, ethanol, propanol, butanol, ethylene glycol and methylcarbitol.

When carboxylic acid is used, preferred are organic carboxylic acid having not less than 7 carbon atoms, for example, capric acid, 2-ethylhexanoic acid, undecylenic acid, nonylic acid and octanic acid.

When aldehyde is used, preferred are those having not less than 7 carbon atoms, for example, capric aldehyde, 2-ethylhexyl aldehyde and undecylic aldehyde.

When amine is used, preferred are those having not less than 6 carbon atoms, for example, heptylamine, octylamine, nonylamine, decylamine, laurylamine, undecylamine and 2-ethylhexylamine. When the carboxylic acids, aldehydes or amines exemplified above are used, a preferred amount thereof and a preferred temperature used therefor are practically the same as those employed in the case of the alcohols.

Examples of other electron donors which can be used in combination with the above-mentioned magnesium compound-solubilizing donors are organic acid esters, organic acid halides, organic acid anhydrides, ethers, ketones, tertiary amines, phosphorous acid esters, phosphoric acid esters, phosphoric acid amides, carboxylic acid amides, nitriles, etc. Concrete examples of these electron donors are those similar to the electron donors (iii) having no active hydrogen as will be mentioned later.

The above-mentioned solution of the magnesium compound in hydrocarbon can also be formed by dissolving in the hydrocarbon other magnesium compound or magnesium metal convertible into the above-mentioned magnesium compound while converting said other magnesium compound or metal into the above-mentioned magnesium compound. For example, the solution of a halogen containing magnesium compound having no reducing ability in hydorcarbon can be formed by dissolving or suspending a magnesium compound having such a group as alkyl, alkoxy, aryloxy, acyl, amino or hydroxy, magnesium oxide or magnesium metal in a hydrocarbon solvent having dissolved therein the above-mentioned alcohol, amine, aldehyde or carboxylic acid while halogenating said magnesium compound, magnesium oxide or magnesium metal with a halogenation agent such as hydrogen halide, silicone halide or halogen. Furthermore, a magnesium compound having no reducing ability can be solubilized in a hydrocarbon solvent by treatment with a compound capable of extinction of reducing ability, such as alcohol, ketone, ester, ether, acid halide, silanol or siloxane, of Grinard reagent, dialkylmagnesium, magnesium hydride or a complex compound thereof with other organometallic compound, for example, such magnesium compound having reducing ability as represented by the formula $$M_a Mg_b R^1_p R^2_q X_r Y_s$$

wherein M represents aluminum, zinc, boron or beryllium atom, $R^1$ and $R^2$ each represent hydrocarbon radical, X and Y each represent the group $OR^3$, $OSiR^4R^5R^6$, $NR^7R^8$ or $SR^9$ in which $R^3$, $R^4$, $R^5$, $R^6$, $R^7$ and $R^8$ each represent hydrogen or hydrocarbon radical and $R^9$ represents hydrocarbon radical, a, b>0, p, q, r, s≧0, b/a≧0.5, and when the number of valences of M is taken as m, the equation $p+q+r+s=ma+2b$ is satisfied and the relation $0≦(r+s)/(a+b)<1.0$ is established.

In preparing the aforementioned catalyst, it is essential to use the magnesium compound having no reducing ability, but this does not mean that a combination use of the magnesium compound having reducing ability should totally be excluded in that case. In many cases, however, the combination use of the magnesium compound having reducing ability in large amounts is found to be unfavorable.

It is also possible to use a solution of electron donors as a solvent for the magnesium compound. Preferred examples of such electron donors as used for this purpose are alcohol, amine, aldehyde and carboxylic acids as exemplified previously, and alcohol is preferred in particular. Examples of other electron donors are phenol, ketone, ester, ether, amide, acid anhydride, acid halide, nitrile, isocyanate, etc. The magnesium compound may be dissolved in such an electron donor solution as mentioned above under the conditions corresponding generally to those employed in the case of dissolving the magnesium compound in the hydrocarbon solvent using the electron donor as mentioned previously. Generally, however, in this case the system must be maintained at high temperatures and, therefore, from the viewpoint of preparing catalysts, the use of the solution of the magnesium compound in hydrocarbon is better than that of the solution of the magnesium compound in electron donor to obtain the catalysts of high performance with case.

The titanium compound (ii) used in the preparation of the solid titanium catalyst component [A] includes, for example, tetravalent titanium compounds represented by the formula Ti $(OR)_gX_{4-g}$ (wherein R is a hydrocarbon radical, X is halogen, and $0≦g≦4$). More particularly, these titanium compounds include titanium tetrahalides such as $TiCl_4$, $TiBr_4$ and $TiI_4$; alkoxytitanium trihalides such as Ti $(OCH_3)$ $Cl_3$, Ti $(OC_2H_5)Cl_3$, Ti (O n-$C_4H_9)Cl_3$, Ti $(OC_2H_5)$ $Br_3$ and Ti (O iso-$C_4H_9$) $Br_3$; dialkoxydihalides such as Ti $(OCH_3)_2Cl_2$, Ti $(OCH_2H_5)_2Cl$, Ti (O n-$C_4H_9)_2Cl$ and Ti $(OC_2H_5)_2Br_2$; trialkoxytitanium monohalides such as Ti $(OCH_3)_3Cl$, Ti $(OC_2H_5)_3Cl$, Ti (O n-$C_4H_9)_3Cl$ and Ti $(OC_2H_5)_3Br$; and tetraalkoxytitanium such as Ti $(OCH_3)_4$, Ti $(OC_2H_5)_4$, Ti (O n-$C_4H_9)_4$, Ti (O iso-$C_4H_9)_4$ and Ti (O 2-ethylhexyl$)_4$.

Of these titanium compounds exemplified above, preferred are halogen containing titanium compounds, in particular, titanium tetrahalides and especially titanium tetrachloride. These titanium compounds may be used either singly or in admixture of two or more, and also they may be diluted, before use, with hydrocarbon compounds or halogenated hydrocarbon compounds.

The electron donor (iii) having no active hydrogen used in the preparation of the solid titanium catalyst component [A] includes organic acid esters, organic acid halides, organic acid anhydrides, ethers, ketones, tertiary amines, phosphorous acid esters, phosphoric acid esters, phosphoric acid amides, carboxylic acid amides, nitriles, etc. Concrete examples of such electron donors as mentioned above include:

ketones of 3-15 carbon atoms such as acetone, methyl ethyl ketone, methyl isobutyl ketone, acetophenone, benzophenone and benzoquinone;

aldehydes of 2-15 carbon atoms such as acetaldehyde, propionaldehyde, octylaldehyde, benzaldehyde, toluylaldehyde and naphthoaldehyde;

organic acid esters of 2-30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl dicyclohexenedicarboxylate, diethyl nadate, diisopropyl tetrahydrophthalate, di-n-butyl phthalate, di-2-ethylhexyl phthalate, γ-butyrolactone, δ-valerolactone, coumarin phthalide and ethylene carbonate;

acid halides of 2-15 carbon atoms such as acetyl chloride, benzoyl chloride, toluylic acid chloride and anisic acid chloride;

ethers and diethers each having 2-20 carbon atoms such as methyl ether, ethyl ether, isopropyl ether, butyl ether, amyl ether, tetrahydrofuran, anisole and diphenyl ether epoxy-p-methane;

acid amides such as acetamide, benzamide and toluylic acid amide;

amines such as methylamine, ethylamine, diethylamine, tributylamine, piperidine, tribenzylamine, aniline, pyridine, picoline and tetramethylenediamine; and nitriles such as acetonitrile, benzonitrile and tolunitrile. These electron donors as exemplified above may be used either singly or in combination of two or more. Of these electron donors, preferred are organic acid esters particularly aromatic carboxylic acid esters. It is not always necessary to use these electron donors as starting substances, and they can also be formed in the course of a process for the preparation of the solid titanium catalyst component [A]. These electron donors may also be used in the form of addition compound or complex compound with other compounds.

The solid titanium catalyst component [A] can be obtained (a) by bringing the above-mentioned liquid magnesium compound (i) having no reducing ability into contact with the liquid titanium compound (ii) in the presence of the electron donor (iii) having no active hydrogen.

This solid titanium catalyst component [A] may also be obtained (b) by bringing the above-mentioned (i) into contact with the above-mentioned (ii), followed by contact with the above-mentioned (iii).

In the procedure (a) mentioned above, when an electron donor has been contained in the above-mentioned (i) and/or the above-mentioned (ii), no further addition of the electron donor (iii) is necessary when said (i) and (ii) are brought into contact with each other. However, it is also possible to add in advance the electron donor (iii) in the (i) and/or the (ii), and said (i) and (ii) are brought into contact with each other while further adding the (iii) thereto.

The electron donor (iii) may be contained in the liquid magnesium compound (i) by simply mixing it with the solution of said magnesium compound, or by previously adding said electron donor (iii) in advance to the solvent in which the magnesium compound is dissolved.

For example, a hydrocarbon solution containing an alkylmagnesium compound having reducing ability, the reducing ability of which has been disappeared by the addition of excess electron donor having no active hydrogen or reduced the reducing ability by the addition of a mixture of an electron donor having active hydrogen and an electron donor having no active hydrogen, is solubilized in a hydrocarbon solvent by the procedure as mentioned previously. It is also possible in that case that instead of using the electron donor (iii) itself from the start, a compound capable of converting into the electron donor (iii) is used and allowed to undergo reaction in situ to form said electron donor (iii).

The amount of the electron donor (iii) used is 0.01–10 moles, preferably 0.01–1 mole and especially 0.1–0.5 mole per mole of the magnesium compound used. Even when the electron donor is used in large amounts, the solid catalyst component of high performance is obtained if the amount of the titanium compound used is controlled, but the use of the electron donor (iii) in such proportion as defined above.

The titanium compound in a liquid state (under contact conditions) is a liquid titanium compound in itself or a solution of the titanium compound in hydrocarbon. The electron donor (iii) or a compound capable of converting into the electron donor (iii) in a process of reaction may be contained in this liquid titanium compound. In this case, however, it is preferable to use the titanium compound in large amount so that a free titanium compound which does not form a complex compound with the electron donor (iii) is present in the system. That is, it is desirable to use the titanium compound in an amount, based on 1 mole of the electron donor (iii), in excess of 1 mole, preferably in the proportion of more than 5 moles. The amount of the titanium compound used must be sufficient for forming a solid product thereof on contact without applying a special separation means, and accordingly when the amount of the titanium compound used is small, no precipitation occur by the contact between the two. The amount of the titanium compound to be used, through it varies according to the kind thereof, contact conditions employed or to the amount of the electron donor used, is more than about 1 mole, usually from about 5 to about 200 moles and preferably from about 10 to about 100 moles. The titanium compound is preferably used in an amount, based on 1 mole of the electron donor (iii), of more than about 1 mole, preferably more than about 5 moles.

In preparing the solid titanium catalyst component [A], the liquid magnesium compound (i) having no reducing ability and the liquid titanium compound are brought into contact with each other by any of the aforementioned procedures for mixing the magnesium compound with the liquid titanium compound. In this case, the resulting solid titanium catalyst component sometimes varies in shape or size according to the contact conditions employed. Of the procedures as aforementioned, preferred is a procedure wherein the liquid titanium compound and the liquid magnesium compound are mixed together at such a sufficiently low temperature that a solid product is not formed rapidly by the contact between the two compounds, and the temperature is then elevated so that the solid product is formed gradually. According to this procedure, it is easy to obtain a granular solid catalyst component relatively large in particle diameter or a spherical solid catalyst component. In this procedure, moreover, when an appropriate amount of the electron donor (iii) having no active hydrogen is allowed to present in the system, there is obtained a granular or spherical solid catalyst component further improved in particle size distribution. The polymer obtained by the use of a catalyst containing such solid titanium catalyst component as mentioned above is granular or spherical in shape, large in particle size distribution and bulk density, and favorable in flowability. The term granular used herein is intended to mean the shape of a solid product as if it were formed by agglomeration of fine particles when viewed from an enlarged photograph thereof. According to the process for preparing the solid catalyst component employed, there can be obtained solid catalyst components in the shape of form granules having rugged surface to a true sphere.

The temperature at which the liquid titanium compound and the liquid magnesium compound are brought into contact with each other is, for example, a temperature of from about $-70°$ to about $+200°$ C. In this case, the two liquid compounds to be brought into contact with each other may be different in temperature from each other. Generally, the solid catalyst component having a favorable shape of granule or sphere and having a high performance is obtained in most cases by the aforementioned procedure wherein the liquid titanium compound and the liquid magnesium compound are brought into contact with each other at a relatively low temperature, for example, a temperature of from $-70°$ to $+50°$ C. In this case, the solid product will not be separated by the contact of the two compounds when the contact temperature is low. In such a case, the solid product is allowed to separate by reaction at a temperature elevated to about 50° to about 150° C., or by prolonging the contact time. The solid product thus separated is desirably washed at least one time at a temperature of from about 50° to about 150° C. with a liquid titanium compound, preferably excess titanium tetrachloride. Thereafter, the solid titanium catalyst component thus obtained is usually washed with hydrocarbon and then used in the preparation of the olefin polymerization catalyst of the present invention.

This procedure is an excellent procedure since the solid catalyst component having high performance is obtained by simple operation.

In the aforementioned procedure (b), the solid titanium catalyst component [A] is prepared in the following manner.

A suspension containing a solid product is obtained by bringing the liquid magnesium compound into contact with the liquid titanium compound under the same conditions as employed in the procedure (a) mentioned previously. Generally, the electron donor (iii) is added to the suspension and allowed to react therewith at a temperature, for example, from about 0° to about 150° C. The amount of the electron donor (iii) used in this case is the same as that used in the procedure (a).

Furthermore, the above-mentioned procedure (b) may also be used in combination with the procedure (a). According to this combined procedure, the shape and particle diameter of the resulting solid product can be adjusted to as desired by virtue of the procedure (a), and the micro-adjustment control of the resulting catalyst component can be made. In one embodiment of this combined procedure, the liquid magnesium compound and the liquid titanium compound are brought into contact with each other in the coexistence of the electron donor (iii) to separate the solid product, and the thus separated solid product is further brought into contact with the electron donor (iii).

The solid titanium catalyst component [A] obtained by each procedure as mentioned above is thoroughly washed with and used for the preparation of the olefin polymerization catalyst of the present invention.

The solid titanium catalyst component [A] thus obtained desirably has a magnesium/titanium (atomic ratio) of usually about 2-100, preferably about 4-50 and especially about 5 to about 30, a halogen/titanium (atomic ratio) of usually about 4-100, preferably 5-90 and especially from about 8 to about 50, and an electron donor/titanium (molar ratio) of usually about 0.01-100, preferably from about 0.2 to about 10 and especially about 0.4 to about 6.

As mentioned previously, this solid titanium catalyst component, in most cases, is granular or almost spherical in shape, and has a specific surface area of usually about more than 10 m²/g, preferably 100-1000 m²/g.

The organometallic compound catalyst component [B] is illustrated hereinafter.

Examples of the organoaluminum compound catalyst component [B] of a metal belonging to Group I to III in the periodic table include compounds having at least one Al-carbon bond in the molecular, for example, organoaluminum compounds represented by the following formula (i)

$$R^1{}_m Al(OR^2)_n H_p X_q \qquad (i)$$

wherein $R^1$ and $R^2$ may be the same or different and represent independently a hydrocarbon group having normally 1 to 15 carbon atoms, preferably 1 to 4 carbon atoms; X is halogen; and m, n, p and q are numbers satisfying $0 < m \leq 3$, $0 \leq n < 3$, $0 \leq p < 3$, $0 \leq q < 3$ and $m + n + p + q = 3$;

complex alkyl compounds of aluminum with Group I metals of the periodic table, represented by the following formula (ii)

$$M^1 Al R^1{}_4 \qquad (ii)$$

wherein $M^1$ is Li, Na or K and $R^1$ is as defined above; and dialkyl compounds of Group II or III metals represented by the following formula $$R^1 R^2 M^2 \qquad (iii)$$

wherein $R^1$ and $R^2$ are as defined above, and $M^2$ is Mg, Zn or Cd.

Examples of the organoaluminum compounds having the formula (i) include:

compounds having the general formula of $R^1{}_m Al(OR^2)_{3-m}$ wherein $R^1$ and $R^2$ are as defined above, and m is a number preferably satisfying $1.5 \leq m \leq 3$;

compounds having the general formula of $R^1{}_m AlX_{3-m}$ wherein $R^1$ and X are as defined above, and m is a number preferably satisfying $0 < m < 3$;

compounds having the general formula of $R^1{}_m AlH_{3-m}$ wherein $R^1$ is as defined above, and m is a number preferably satisfying $2 \leq m < 3$; and compounds having the general formula of $R^1{}_m Al(OR^2)_n X_q$ wherein $R^1$, $R^2$ and X are as defined above, and m, n and q are numbers satisfying $0 < m \leq 3$, $0 \leq n < 3$, $0 \leq q < 3$ and $m + n + q = 3$.

Concrete examples of the organoaluminum compounds having the formula (i) include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented by, for example, the formula of $R^1{}_{2.5}Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as alkylaluminum dihalides such as ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as alkylaluminum dihydride, for example, ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

Furthermore, the organoaluminum compounds similar to the above-mentioned compounds represented by formula (i) include organoaluminum compounds in which two or more aluminum atoms are bonded together via, for example, an oxygen atom or a nitrogen atom. Concrete examples of such compounds are as follows:

$(C_2H_5)_2AlOAl(C_2H_5)_2$, $(C_4H_9)_2AlOAl(C_4H_9)_2$, and $(C_2H_5)_2AlNAl(C_2H_5)_2$, and methylaluminoxane.
  |
  $C_2H_5$ Examples of the organoaluminum compounds having the formula (ii) include $LiAl(C_2H_5)_4$, and $LiAl(C_7H_{15})_4$.

Among the above-exemplified compounds, particularly preferred are trialkylaluminum compounds and alkylaluminum compounds in which two or more aluminum compounds are bonded together.

Examples of the compound represented by the above-mentioned formula (3) are diethylzinc and diethylmagnesium. Further, alkylmagnesium halides such as ethylmagnesium chloride is also usable.

Of the compounds represented by the above-mentioned formulas (1), (2) and (3), respectively, particularly preferred are trialkylaluminum, alkylaluminum halides or mixtures thereof.

Polymerization of olefin with the olefin polymerization catalyst containing the above-mentioned components [A] and [B] in the present invention is not limited only to copolymerization of ethylene and pentene-1, but it also includes copolymerization of three or more components, for example, ethylene, pentene-1 and small amounts of other α-olefins or polyenes copolymerizable therewith. The other α-olefins usable in this copolymerization include, for example, 2-methylpropylene, 1-butene, 1-hexene, 4-methyl-1-pentene, 3-methyl-1-pentene, 1-octene, 1-nonene, 1-decene, 1-undecene, and 1-dodecene. Further, the polyenes include, for example, butadiene, isoprene, 1,4-hexadiene, dicyclopentadiene and 5-ethylidene-2-norbornene.

In the process for the preparation of the first ethylene/pentene-1 copolymer according to the present invention, ethylene and pentene-1 are copolymerized with the above-mentioned catalyst by vapor phase polymerization.

The vapor phase polymerization of ethylene and pentene-1 is carried out using a polymerizer equipped with a fluidized bed reactor or a stirring fluidized bed reactor. In this case, the solid titanium catalyst component [A] is used, as it is, or used as a suspension thereof in a hydrocarbon medium or olefin, and the organometallic compound catalyst component [B], either diluted or not diluted, is fed to the polymerization system.

Further, the molecular weight of the resulting polymer can be modified by the addition of hydrogen to the polymerization system.

In the present invention, it is preferably to use a pre-polymerized catalyst. In carrying out the pre-polymerization, the above-mentioned electron donor catalyst component may be present in the system in addition to the above-mentioned catalyst component [A] and organometallic compound catalyst component [B]. In that case, the electron donor catalyst component may be used in an amount, based on 1 gram atom of titanium of the titanium catalyst component [A], of 0.01–30 moles, preferably 0.1–10 moles and especially 0.5–5 moles. In the pre-polymerization, α-olefin of 2–10 carbon atoms is pre-polymerized in an inert hydrocarbon solvent, using a liquid monomer as a solvent or without using any solvent. It is preferable, however, to carry out the pre-polymerization in the inert hydrocarbon solvent.

The amount of the α-olefin polymer resulting from the pre-polymerization is, based on 1 g of the titanium catalyst component, 0.5–5000 g, preferably 1–1000 g and especially 3–200 g.

The inert hydrocarbon solvent used in the pre-polymerization includes aliphatic hydrocarbons such as propane, butane, n-pentane, isopentane, n-hexane, isohexane, n-heptane, n-octane, isooctane, n-decane, n-dodecane and kerosin; alicyclic hydrocarbons such as cyclopentane, methylcyclopentane, cyclphexane and methylcyclohexane; aromatic hydrocarbons such as benzene, toluene and xylene; and halogenated hydrocarbons such as methylene chloride, ethyl chloride, ethylene chloride and chlorobenzene, and of these hydrocarbons exemplified above, preferred are aliphatic hydrocarbons, particularly those of 3–10 carbon atoms.

In the case that non-active solvent or liquid monomer is used in the pre-polymerization, the amount of the solid titanium catalyst component is, in the term of titanium atom, 0.001 to 500 mmol, preferably 0.005 to 200 mmol per 1 liter solvent, and the organoaluminum compound [B] is used in an amount that Al/Ti (atomic ratio) of 0.5 to 500, preferably 1.0 to 50, and especially 2.0 to 20.

The α-olefin used in the pre-polymerization includes those of not more than 10 carbon atoms such as ethylene, propylene, 1-butene, 1-pentene, 4-methyl-1-pentene, 3-methyl-1-pentene, 1-heptene, 1-octene and 1-decene. Of these α-olefins, preferred is ethylene. In carrying out the pre-polymerization, these α-olefins may be homopolymerized on the catalyst component or may be copolymerized thereon so long as the polymer to be prepared using this pre-copolymerized catalyst component is a crystalline polymer.

The polymerization temperature employed in the pre-polymerization varies according to the kind of α-olefin used or to the kind of an inert hydrocarbon solvent used, and cannot be defined indiscriminately. Generally, however, the polymerization temperature is from $-40°$ to $80°$ C., preferably from $-20°$ to $40°$ C. and especially from $-10°$ to $30°$ C.

In the pre-polymerization, hydrogen may coexist with the polymerization system.

In the present invention, copolymerization of ethylene and pentene-1 is carried out using preferably the pre-polymerized catalyst as mentioned above. In the copolymerization of ethylene and pentene-1, the ethylene/pentene-1 copolymer is prepared so as to amount to 1,000–100,000 g, preferably 2,000–50,000 g and especially 3,000–30,000 g per 1 gram of the titanium catalyst component [A] contained in the aforesaid catalyst on which α-olefin has been pre-polymerized.

The amount, based on 1 gram atom of titanium in the titanium catalyst component [A], of the organometallic compound catalyst component [B] used in the pre-polymerized catalyst is 1–1000 moles, preferably 3–500 moles and especially 5–100 moles. In that case, other compounds such as an electron donor catalyst component may be used, and the amount, based on 1 gram atom of the metallic atom in the organometallic compound component [B], of the electron donor catalyst component is not more than 100 moles, preferably not more than 1 mole and especially from 0.001 to 0.1 mole.

In the copolymerization mentioned above, the polymerization temperature employed is 20°–130° C., preferably 50°–120° C. and especially 70°–110° C., and the polymerization pressure is 1–50 kg.cm$^2$, preferably 2–30 kg/cm$^2$ and especially 5–20 kg/cm$^2$. Further, an inert gas such as methane, ethane, propane, butane or nitrogen may suitably injected into the polymerization system so as to maintain a vaporous condition inside the system.

In the present invention, the polymerization may be carried out by any of the batchwise, semi-continuous and continuous methods.

The second ethylene/pentene-1 copolymer of the present invention is now illustrated hereinafter.

The second ethylene/pentene-1 copolymer of the invention is a random copolymer obtained by vapor phase copolymerization of ethylene and pentene-1 in the presence of an olefin polymerization catalyst. The second ethylene/pentene-1 copolymer of the invention may be further copolymerized, in the same manner as in the case of the first ethylene/pentene-1 copolymer of the invention, with small amounts of other α-olefins or polyenes.

The second ethylene/pentene-1 copolymers of the present invention have a melt flow rate (MFR) of 0.01 to 100 g/10 min, preferably 0.05 to 50 g/10 min as measured according to ASTM D 1238E.

The second ethylene/pentene-1 copolymers of the present invention have a density of 0.88 to 0.95 g/cm$^3$, preferably 0.89 to 0.94 g/cm$^3$.

The second ethylene/pentene-1 copolymers of the present invention comprise 2 to 25% by weight, preferably 4 to 23% by weight, particularly preferably 6 to 20% by weight of a constitution unit derived from pentene-1 and 75 to 98% by weight, preferably 77 to 96% by weight, particularly preferably 80 to 94% by weight of a constitution unit derived from ethylene.

The second ethylene/pentene-1 copolymers may contain not more than 10% by weight, preferably not more than 5% by weight, particularly preferably not more than 3% by weight of a constitution unit derived from one or more α-olefins or polyenes in addition to ethylene and pentene-1 as mentioned above.

The DSC melt-peak pattern of ultra-slowly cooled sample of the second ethylene/pentene-1 copolymer of the present invention has two melt-peaks and the relationship between the ratio of Hh/Hl (wherein Hh is a peak height on the higher temperature side and Hl is a peak height on the lower temperature side) and the density (d) of the copolymer fulfills the following formula [6].

$$60d - 52.0 < Hh/Hl < 80d - 69.0 \tag{6}$$

Preferably, $$60d - 52.0 < Hh/Hl < 80d - 69.1 \tag{6'}$$

Particularly preferably, $$60d - 51.9 < Hh/Hl < 80d - 69.2 \tag{6''}$$

wherein Hh represents a peak height on the higher temperature side, Hl represents a peak height on the lower temperature side, and d is the density of the copolymer.

The ratio (RS) of the impact strength of a film of 40 μm in thickness to the tear strength thereof in the take-off direction is represented by the following formula [7], said film being obtained by casting the ethylene/pentene-1 copolymer having the above-mentioned characteristics according to the present invention.

$$RS \geq -20 \log MFR - 1000d + 968 \tag{7}$$

wherein MFR is the melt flow rate of the copolymer and d is the density of the copolymer.

Preferably, $$RS \geq -20 \log MFR - 1000d + 973 \tag{7'}$$

Particularly preferably, $$200 \geq RS \geq -20 \log MFR - 1000d + 975 \tag{7''}$$

When the ratio (RS) of the impact strength to the tear strength is lower than ($-20 \log MFR - 1000d + 968$), the resulting film has poor tear properties, though it has a high impact strength, or the resulting film is inferior in impact strength, though it has good tear properties. The film of 40 μm in thickness, used for the measurement of the RS value, is a film prepared by molding the ethylene/pentene-1 copolymer under the following conditions into a film by using a T-die film molding machine equipped with a 65 mmΦ extruder.

Molding conditions:
Resin temperature: 220° to 240° C.
Chill roll temperature: 30° to 40° C.
Film-forming rate: 20 to 30 m/min
Draft ratio (film thickness/lip opening): 0.05 to 0.07

The cast film of 40 μm in thickness, obtained by processing the copolymer of the present invention in the manner mentioned above has an impact strength of generally not lower than 1000 kg·cm/cm, preferably not lower than 1200 kg·cm/cm.

It is preferred that the tear strength ($T_{MD}$) of said film in the take-off direction and the melt flow rate (MFR) of the ethylene/pentene-1 copolymer fulfills the relationship represented by the following formula [8].

$$\log T_{MD} \leq -0.37 \log MFR - 5.1d + 6.72 \tag{8}$$

wherein d is the density of the copolymer.
Preferably, $$\log T_{MD} \leq -0.37 \log MFR - 5.1d + 6.65 \tag{8'}$$

Particularly preferably, $$\log T_{MD} \leq -0.37 \log MFR - 5.1d + 6.59 \tag{8''}$$

Films excellent in impact strength as well as tear properties can be obtained from the ethylene/pentene-1 copolymers which fulfills the relationship represented by the above formula [8] with respect to the tear strength ($T_{MD}$) of the film in the take-off direction and MFR.

Pressed sheets of 2 mm in thickness obtained by molding the ethylene/pentene-1 copolymers of the present invention as mentioned above according to ASTM D 1928 have stress cracking resistance [SC resistance (ESCR), measured according to ASTM D 1692, antalocks 100%, 50° C.] of at least 10 hr and satisfy the relationship represented by the following formula [9-a].

$$ESCR \geq 0.7 \times 10^4 (\log 80 - \log MFR)^3 (0.952-d) \tag{9-a}$$

wherein $2.0 \leq MFR \leq 50$ and d is the density of the copolymer.
Preferably, $$ESCR \geq 0.9 \times 10^4 (\log 80 - \log MFR)^3 (0.952-d) \tag{9'-a}$$

Particularly, $$ESCR \geq 1.1 \times 10^4 (\log 80 - \log MFR)^3 (0.952-d) \tag{9''-a}$$

Further, pressed sheets of 2 mm in thickness, obtained by molding the ethylene/pentene-1 copolymers of the present invention according to ASTM D 1928 have stress cracking resistance [SC resistance (ESCR), measured according to ASTM D 1692, antalocks 10%, 50° C.] of at least 20 hr and satisfy the relationship represented by the following formula [9-b].

$$ESCR \geq 1.4 \times 10^4 (\log 40 - \log MFR)^2 (0.952-d) \tag{9-b}$$

wherein $1.0 \leq MFR \leq 20$ and d is the density of the copolymer.

Preferably, $$\text{ESCR} \geq 1.7 \times 10^4 (\log 40 - \log \text{MFR})^2 (0.952-d) \qquad [9'\text{-b}]$$

Particularly preferably,
$$\text{ESCR} \geq 2.0 \times 10^4 (\log 40 - \log \text{MFR})^2 (0.952-d) \qquad [9''\text{-b}]$$

Furthermore, pressed sheets of 2 mm in thickness, obtained by molding the ethylene/pentene-1 copolymers of the present invention according to ASTM D 1928 have stress cracking resistance [SC resistance (ESCR), measured according to ASTM D 1692, antalocks 10%, 60° C.] of at least 50 hr and satisfy the relationship represented by the following formula [9-c].

$$\text{ESCR} \geq 0.50 \times 10^4 (\log 100 - \log \text{MFR}) (0.952-d) \qquad [9\text{-c}]$$

wherein $0.1 \leq \text{MFR} \leq 5$ and d is the density of the copolymer.
Preferably, $$\text{ESCR} \geq 0.65 \times 10^4 (\log 100 - \log \text{MFR}) (0.952-d) \qquad [9'\text{-c}]$$

Particularly preferably,
$$\text{ESCR} \geq 0.80 \times 10^4 (\log 100 - \log \text{MFR}) (0.952-d) \qquad [9''\text{-c}]$$

Moreover, it is preferred that the haze of the above-mentioned pressed sheets and the melt flow rate (MFR) of the ethylene/pentene-1 copolymers satisfy the relationship represented by the following formula [10].

$$\text{Log HAZE} \geq 15d - 0.45 \log \text{MFR} - 12.23 \qquad [10]$$

wherein d is the density of the copolymer.
More preferably, $$\text{Log HAZE} \geq 15d - 0.45 \log \text{MFR} - 12.26 \qquad [10']$$

Particularly preferably,
$$\text{Log HAZE} \geq 15d - 0.45 \log \text{MFR} - 12.30 \qquad [10'']$$

The press sheets of 2 mm in thickness, used for the measurements of the above-mentioned physical properties were prepared from the ethylene/pentene-1 copolymers according to ASTM D 1928.

The measurement of HAZE was made according to ASTM D 1003.

The second ethylene/pentene-1 copolymer of the invention as illustrated above may be prepared by the second process for the preparation of ethylene/pentene-1 copolymer according to the invention as will be detailed hereinafter.

In the process for the preparation of the second ethylene/pentene-1 copolymer according to the invention, vapor phase copolymerization of ethylene and pentene-1 in the presence of such an olefin polymerization catalyst as will be mentioned below is included.

The olefin polymerization catalyst used in the process for the preparation of the second ethylene/pentene-1 copolymer according to the invention may include, for example, an olefin polymerization catalyst containing a solid titanium catalyst component [A] for olefin polymerization obtained by reaction of a hydrocarbon-insoluble solid magnesium aluminum composite selected from ($A_1$) or ($A_2$) mentioned below and a tetravalent titanium compound and containing at least titanium atoms in a low valent state in the proportion of more than 10% and having OR group in an amount of from 1 to 15 in terms of OR/Mg (weight ratio) and an organoaluminum compound catalyst component [B], said ($A_1$) representing a solid magnesium.aluminum composite having $R^1O$ group and $R^2$ group ($R^1$ and $R^2$ is each a hydrocarbon residue) obtained from a liquid magnesium compound formed from a mixture containing a magnesium compound and an electron donor or a liquid magnesium compound formed from a solution of a magnesium compound in hydrocarbon solvent, and said ($A_2$) representing a solid magnesium.aluminum composite containing $R^1O$ group and $R^3$ group ($R^3$ is a hydrocarbon residue) obtained by reaction of a solid magnesium compound (B) containing $R^1O$ group or $R^1OH$ group obtained from a liquid magnesium compound formed from a mixture containing a magnesium compound and an electron donor or a liquid magnesium compound formed from a solution of a magnesium compound in hydrocarbon solvent or the above-mentioned ($A_1$) with an organometallic compound (C) of a metal belonging to the group I through III of the periodic table.

Hereinafter, this olefin polymerization catalyst and the reaction system using said catalyst are illustrated. In this connection, however, the way of preparing the second ethylene/pentene-1 copolymer of the invention is not limited only to the catalyst and reaction system using the same as will be illustrated below, but said copolymer can be prepared by using other catalysts or other reaction systems.

The above-mentioned olefin polymerization solid titanium catalyst component [A] is typically a component carrying a low valent titanium thereon obtained by reaction of a magnesium.aluminum composite having $R^1O$ group and a hydrocarbon residue obtained by reaction among a liquid magnesium compound as a starting material, an organoaluminum compound, a $R^1O$ group ($R^1$ is a hydrocarbon residue) forming compound and optionally other reaction reagent with a tetravalent titanium compound.

The liquid magnesium compound used above may be, for example, a solution of the magnesium compound in hydrocarbon, electron donor or mixture thereof, or may be a melt of the magnesium compound. The magnesium compound used for this purpose includes halogenated magnesium such as magnesium chloride, magnesium bromide, magnesium iodide or magnesium fluoride; alkoxy magnesium halide such as methoxy magnesium chloride, ethoxy magnesium chloride, isopropoxymagnesium chloride, butoxy magnesium chloride or octoxy magnesium chloride; aryloxy magnesium halide such as phenoxy magnesium chloride or methylphenoxy magnesium chloride; alkoxy magnesium such as ethoxy magnesium, isopropoxy magnesium, butoxy magnesium or octoxy magnesium; aryloxy magnesium such as phenoxy magnesium or dimethylphenoxy magnesium; and magnesium carboxylate such as magnesium laurate or magnesium stearate. The magnesium compounds used herein may also be complex or composite compounds of the above-mention magnesium compounds with other metals, or mixtures thereof. Further, the magnesium compounds used herein may also be mixtures of two or more of these compounds exemplified above.

Of these magnesium compounds exemplified above, preferred are those represented by $MgX_2$, $Mg(OR^5)X$ or $Mg(OR^5)_2$ wherein X is halogen and $R^5$ is a hydrocarbon residue) such as halogenated magnesium, alkoxy magnesium halide, aryloxy magnesium halide, alkoxy magnesium or arloxy magnesium. Of the halogen containing magnesium compounds, preferred are magnesium chloride, alkoxy magnesium halide and aryloxy magnesium halide, and especially preferred is magnesium chloride.

The liquid magnesium compound mentioned above is suitably a solution of said magnesium compound in a hydrocarbon solvent or an electron donor, in which said magnesium compound is soluble, or in a mixture thereof. The hydrocarbon solvent used for this purpose includes aliphatic hydrocarbons such as pentene, hexane, heptane, octane, decane, dodecane, tetradecane and kerosine; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

The solution of the magnesium compound in the hydrocarbon solvent may be obtained by various methods, though they vary according to the kind of the magnesium compound and the solvent used, such as a method wherein the two compounds are simply mixed together (for example using $Mg(OR^5)_2$ in which $R^5$ is a hydrocarbon residue having 6-20 carbon atoms as the magnesium compound), and a method wherein the magnesium compound is mixed with the hydrocarbon solvent in the presence of an electron donor in which said magnesium compound is soluble, for example, alcohol, aldehyde, amine, carboxylic acid or a mixture thereof, or a mixture comprising said mixture and other electron donor, and the resulting mixture is heated if necessary. For example, when a halogen containing magnesium compound is dissolved in the hydrocarbon solvent using alcohol, the amount of the alcohol used, though it varies according to the kind and amount of the hydrocarbon solvent used and to the kind of magnesium compound used, is preferably more than about 1 mole, suitably from about 1 to about 20 moles, more suitably from about 1.5 to about 12 moles, per 1 mole of the halogen containing magnesium compound. When an aliphatic hydrocarbon and/or an alicyclic hydrocarbon is used as the hydrocarbon solvent in the above case, alcohol is used in the proportion as defined above, wherein the halogen containing magnesium compound can be solubilized by the use of a relatively small amount of the alcohol, for example, using alcohol having more than 6 carbon atoms in combination with said alcohol in an amount, based on 1 mole of the halogen containing magnesium compound, of more than about 1 mole, preferably more than about 1.5 moles, and the resulting catalyst component comes to have a good shape. For example, when alcohol having not more than 5 carbon atoms is used alone in the above case, it is necessary to use more than about 15 moles of the alcohol per mole of the halogen containing magnesium compound, and no shape of the resulting catalyst component is comparable to that of the catalyst component obtained in the above case. On the one hand, the halogen containing magnesium compound becomes soluble in an aromatic hydrocarbon by the use of alcohol in such an amount as defined above, irrespective of the kind of the alcohol used.

The halogen containing magnesium compound and alcohol are brought into contact with each other in a hydrocarbon solvent at a temperature above room temperature and, according to the kind of the alcohol and hydrocarbon solvent used, at a temperature of higher than about 65° C., suitably about 80°-300° C. and more suitably from about 100° to about 200° C. for a period of from about 15 minutes to about 5 hours, preferably from about 30 minutes to about 2 hours.

Preferable as the alcohol used in that case are those having not less than 6 carbon atoms, for example, aliphatic alcohol such as 2-methylpentanol, 2-ethylpentanol, n-heptanol, n-octanol, 2-ethylhexanol, decanol, dodecanol, tetradecyl alcohol, undecenol, oleyl alcohol or stearyl alcohol; alicyclic alcohol such as cyclohexanol or methylcyclohexanol; aromatic alcohol such as benzyl alcohol, methylbenzyl alcohol, α-methylbenzyl alcohol or α,α-dimethylbenzyl alcohol; alkoxy-containing aliphatic alcohol such as n-butyl cellosolve or 1-butoxy-2-propanol. Examples of other alcohol include those having not more than 5 carbon atoms such as methanol, ethanol, propanol, butanol, ethylene glycol and methylcarboitol.

The magnesium compound may also be dissolved in an electron donor other than alcohol. Preferred examples of the electron donor used in this case include amine, aldehyde and carboxylic acid, and examples of an electron donor other than those mentioned above include phenol, ketone, ester, ether, amide, acid anhydride, acid halide, nitrile and isocyanate. The magnesium compound may be dissolved in the electron donor as exemplified above under the conditions similar to those employed in the case of dissolving the magnesium compound in the hydrocarbon solvent using the electron donor. In this case, however, the system must be maintained at a relatively high temperature and, therefore, from the technical viewpoint of the preparation of catalyst, the catalyst component of high performance is easily obtained when the solution of the magnesium compound in the hydrocarbon solvent is used.

Examples of the liquid magnesium compound include melts of the magnesium compounds. A typical example of the melts is, for example, a melt of a complex of halogenated magnesium with such an electron donor as exemplified previously. Suitable as the melt referred to herein is a melt of a halogenated magnesium.alcohol complex represented by $MgX_2 \cdot nR^1OH$ ($R^1$ is a hydrocarbon residue, and n is a positive number).

Stated below is the process for the preparation of a solid magnesium aluminum composite having $R^1O$ group and $R^3$ group (or $R^2$ group) ($R^1$, $R^2$ and $R^3$ are each a hydrocarbon residue, and $R^3$ (or $R^2$) is a reducing group bonded directly to magnesium of aluminum atom) from the liquid magnesium compound. The magnesium aluminum composite referred to herein is represented by the empirical formula $Mg_aAl_bR^2_c$ (or $R^3c$) $(OR^1)_dX^2_e$ wherein $X^2$ is halogen, and $2a+3b=c+d+e$. Under certain circumstances, other compounds or electron donors may be bonded to this complex. In this magnesium aluminum complex represented by the above-mentioned empirical formula, Al/Mg (atomic ratio) is 0.05-1, preferably 0.08-0.5 and especially 0.12-0.3, $R^1O$ group is in an amount, based on 1 part by weight of magnesium, of 0.5-15 parts by weight, preferably 1-10 parts by weight and especially 2-6 parts by weight, the hydrocarbon residue $R^2$ (or $R^3$) is in an amount, based on 1 magnesium atom, of 0.01-0.5 equivalent, preferably 0.03-0.3 equivalent and especially 0.05-0.2 equivalent, and $X^2$/Mg (atomic ratio) is 1-3, preferably 1.5-2.5.

The process for the preparation of the above-mentioned magnesium aluminum composite is illustrated below in details.

The magnesium aluminum composite is prepared by a process wherein the liquid magnesium compound and an organoaluminium compound are brought into contact with each other to obtain directly said composite.

In this process, at least one of the liquid magnesium compound and organoaluminum compound used is a compound having $R^1O$ group or $R^1O$ group forming compound, e.g. a compound having $R^1OH$ group and, at the same time, a halogen compound must be used.

For example, the desired magnesium composite may be obtained by the reaction between $MgX_2$ and alcohol, preferably the reaction between the solution of the magnesium compound containing a hydrocarbon and an alkylaluminum compound, or the reaction between $Mg(OR^5)X$ or $Mg(OR^5)_2$ and alcohol, preferably by the reaction between the solution of the magnesium compound containing a hydrocarbon or a solution of $Mg(OR^5)_2$ in a hydrocarbon and alkylaluminum halide.

The alkylaluminum compound referred to above includes trialkylaluminum such as triethylaluminum or tributylaluminum; trialkenylaluminum such as triisoprenylaluminum; dialkylaluminum alkoxide such as diethylaluminum ethoxide or dibutylaluminum butoxide; alkylaluminum sesquialkoxide such as ethylaluminum sesquiethoxide or butylaluminum sesquibutoxide; alkoxylated alkylaluminum having an average composition represented by $R^1{}_{2.5}Al(OR^2)_{0.5}$; dialkylaluminum halide such as diethylaluminum chloride, dibutylaluminum chloride or diethylaluminum bromide; alkylaluminum sesquihalide such as ethylaluminum sesquichloride, butylaluminum sesquichloride or ethylaluminum sesquibromide; partially halogenated alkylaluminum such as alkylaluminum dihalide, for example, ethylaluminum dichloride, propylaluminum dichloride or butylaluminum dibromide; dialkylaluminum hydride such as diethylaluminum hydride or dibutylaluminum hydride; partially hydrogenated alkylaluminum such as alkylaluminum dihydride, for example, ethylaluminum dihydride or propylaluminum dihydride; and partially alkoxylated and halogenated alkylaluminum such as ethylaluminum ethoxychloride, butylaluminum butoxychloride or ethylaluminum ethoxybromide.

Further, alkylaluminum halide may be selected from among the halogen containing alkylaluminum compounds as exemplified above.

The process for the preparation of the magnesium aluminum composite as illustrated above includes not only a process which comprises bringing the liquid magnesium compound into contact with the alkylaluminum compound in one stage as aforesaid, but also a process which involves a multi-stage contact between the liquid magnesium compound and the alkylaluminum compound, wherein said liquid magnesium compound is first brought into contact with part of said alkylaluminum compound to form a solid magnesium compound, followed by further contact of said solid magnesium compound with an alkylaluminum compound which is the same as or different from the alkylaluminum compound first used. Usually, of the two processes mentioned above, the latter is better than the former, because a particle diameter of the resulting composite or the amount of organic group contained therein can easily be adjusted, and eventually it becomes easy to obtain the desired catalyst of high performance.

In the process involving such a multi-stage contact as mentioned above, it is also possible that after completion of the first-stage contact, the solid magnesium compound formed thereby is separated from the liquid system, and the thus separated solid magnesium compound proceeds to the subsequent reaction in the second stage-contact.

Eventually, it is desirable to design that the solid magnesium aluminum composite obtained by the above-mentioned processes will come to have such composition as defined previously. For this purpose, it is preferable to use the alkylaluminum compound in an appropriate amount at the time of effecting the above-mentioned contact between the liquid magnesium compound and said alkylaluminum compound. For example, in the process involving the multi-stage contact as aforesaid, when a solution using alcohol is used as the liquid magnesium compound, the alkylaluminum compound is used in such an amount that $R^2$—Al bond of said alkylaluminum compound is more than 0.5 equivalent based on 1 equivalent of the hydroxyl group of said alcohol. When the amount of the alkylaluminum compound used is excessively large, the resulting solid component deteriorates in shape, and no granular composite is obtained sometimes. On that account, the alkylaluminum compound is used in such an amount, based on 1 equivalent of the hydroxyl group of the alcohol, of 0.5-10 equivalent, preferably 0.7-5 equivalent, further preferably 0.9-3 equivalent and especially 1.0–2 euivalent in terms of $R^2$—Al bond.

In that case, it is preferable to use trialkylaluminum as the alkylaluminum compound, because the solid composite having a good shape is easy to obtain. Other preferred organoaluminum compounds are dialkylaluminum halide, dialkylaluminum hydride and dialkylaluminum alkoxide.

In the contact between the liquid magnesium compound and alkylaluminum compound, the concentration in the liquid system of the magnesium compound is 0.005-2 mol/l, especially 0.05-1 mol/l.

Separation of the magnesium compound takes place, for example, an insoluble magnesium compound is formed by the reaction of alkylaluminum compound with alcohol. When the separation of the magnesium compound proceeds so rapidly, it is sometimes difficult to obtain the solid composite excellent in shape and having an appropriate particle diameter and a narrow particle size distribution, accordingly the thus separated solid composited cannot sometimes be the optimum carrier for slurry polymerization catalyst. On that account, it is desirable that the above-mentioned contact is effected under mild conditions, taking account of the contact temperature, the amount of the alkylaluminum compound added at the time of separation of the solid or the rate of addition of the alkylaluminum compound or concentration of each compound used.

From the reasons cited above, it is preferable to effect the contact of the liquid magnesium compound with the organoaluminum compound at a temperature of from −50° to 100° C., especially from −30° to 50° C., followed by reaction at a temperature of from 0° to 200° C., preferably from 40° to 150° C. When the solid magnesium compound is first formed, and the solid magnesium compound thus formed is then brought into contact with the alkylaluminum compound to effect the reaction as aforesaid, the reaction temperature employed therefor is from 0° to 250° C., especially from 20° to 130° C.

In either case, the contact and reaction conditions employed are so designed that R0 group and $R^2$ group of the resulting solid magnesium aluminum composite respectively come within the range as defined previously and, at the same time, it is also desirable to select these conditions so that the resulting composite has a particle diameter of more than 1 μm, especially more than 5 μm but not more than 100 μm, a particles size distribution of 1.0-2.0 in terms of geometric standard deviation and said compound will come to have a spherical or granular shape.

Further, the solid magnesium aluminum composite may be prepared by using an organometallic compound of a metal other than aluminum belonging to the group I-III of the periodic table, for example, alkyllithium, alkylmagnesium halide or dialkylmagnesium, instead of the alkylaluminum compound, with which the solid magnesium compound first separated is brought into contact.

The solid magnesium aluminum composite may be prepared by other processes than those mentioned previously, for example, a process in which a halogenation agent such as chlorine, hydrogen chloride silicon tetrachloride or halogenated hydrocarbon is used in any stage where the alkylaluminum compound is used in the previously mentioned processes, a process in which a halogenation agent is used before or after the use of the alkylaluminum compound. These processes mentioned above are useful in substitution of the process using alkylaluminum halide.

The process using the halogenation agent prior to the use of the alkylaluminum compound is useful as a means for forming a solid magnesium compound containing $R^1O$ group or $R^1OH$ group from a liquid magnesium compound, and the desired solid magnesium aluminum composite may be prepared by reaction of the thus formed solid magnesium compound with the alkylaluminum compound. For example, the above-mentioned solid magnesium compound may be prepared by reaction of $MgX_2$, $Mg(OR^5)X$ or $Mg(OR^5)_2$ with alcohol, preferably with a solution containing a hydrocarbon and the halogenation agent, or by reaction of hydrocarbon solvent containing $Mg(OR^5)_2$ with the halogenation agent. The solid magnesium compound thus prepared is represented by the empirical formula $MgX_{2-q}(OR^5)_q \cdot nR^6OH$ ($0 \leq q < 2$, $n \geq 0$), and optionally forms a composite with other compound component in some cases. In this process, the reactants are used in such a proportion that halogen will amount to about 1-1000 equivalent per 1 atom of magnesium present in the magnesium compound. The reaction between the solid magnesium compound thus prepared and the alkylaluminum compound may be carried out in accordance with the procedure of the last stage of the above-mentioned process involving the multi-stage contact between the solid magnesium compound and the alkylaluminum compound.

The solid magnesium compound as mentioned above may also be prepared by other process than those illustrated above, in which the magnesium compound of the formula $MgX_{2-q}(OR^5)_q \cdot nR^6OH$ in a molten state is solidified by cooling, preferably said molten magnesium compound is dispersed in a hydrocarbon medium and then solidified by cooling.

In any of the processes mentioned above, it is preferable to select the separation conditions under which the solid magnesium compound is separated so that the resulting solid magnesium compound has a particle diameter of more than 1 μm, especially more than 5 μm but not more than 100 μm, and a particle size distribution of 1.0-2.0 in terms of geometric standard deviation, and said compound will come to have a spherical or granular shape.

The amount of the reducing group $R^2$ or $R^3$ contained in the solid magnesium aluminum composite obtained by the processes mentioned above is determined in the following manner.

To a closed flask of about 200 ml capacity thoroughly purged with dry nitrogen and charged with about 0.5 g of a solid magnesium aluminum composite is gradually added dropwise with stirring about 25 ml of water. After the lapse of about 20 minutes, the vapor phase and water phase portion in the flask were respectively withdrawn by means of a microsyringe, followed by determination of the alkane concentration of each portion by gas chromatography. The measured value of the alkane concentration in each portion is multiplied by a value of the volume of each portion, and the products thus obtained were then combined to obtain a total amount of alkane formed. This total amount is regarded as the total amount of the alkane formed by reaction of the alkyl group present in said composite with water, and can be considered to be the amount of the reducing group present in said composite.

The thus obtained solid magnesium aluminum composite having $R^1O$ group and the organic reducing group is brought into contact with a tetravalent titanium compound used in such a proportion that Ti/Mg (atomic ratio) is less than 1, preferably 0.01-0.7 and especially 0.04-0.5 to prepare a solid titanium compound. At least a part of titanium supported on this compound has been reduced to a low valent state, for example, three valences.

There are various tetravalent titanium compounds used for the preparation of the solid titanium component [A], but usually used are those represented by $Ti(OR)_gX_{4-g}$ wherein R is a hydrocarbon residue, X is halogen atom, and $0 \leq g \leq 4$. More concretely, useful tetravalent titanium compounds include titanium tetrahalide such as $TiCl_4$, $TiBr_4$ $TiI_4$; alkoxy titanium trihalide such as $Ti(OCH_3)Cl_3$, $Ti(OC_2H_5)Cl_3$, $Ti(O\ n\text{-}C_4H_9)Cl_3$, $Ti(OC_2H_5)Br_3$ or $Ti(O\text{-iso-}C_4H_9)\ Br_3$; dialkoxy titanium dihalide such as $Ti(OCH_3)_2Cl_2$, $Ti(OC_2H_5)_2Cl_2$, $Ti(O\ n\text{-}C_4H_9)_2Cl_2$ or $Ti(OC_2H_5)_2Br_2$; trialkoxy titanium monohalide such as $Ti(OCH_3)_4$, $Ti(OC_2H_5)_4$, $Ti(O\ n\text{-}C_4H_9)_4$, $Ti(O\text{-iso-}C_4H_9)_4$ or $Ti(O\text{-}2\text{-ethylhexyl})_4$. Of these tetravalent titanium compound as exemplified above, preferred are titanium tetrahalide and alkoxy titanium trihalide, and particularly the use of alkoxy titanium trihalde is preferable.

The catalytic reaction of the solid magnesium aluminum composite with the titanium compound is carried out preferably in a hydrocarbon medium under the conditions selected so that in the end solid titanium catalyst component resulting from the contact with the titanium compound, $R^7O$ group/Mg weight ratio ($R^7$ is a hydrocarbon residue) is 0.05-15, preferably 1-10 and especially 2-6. Herein $R^7O$ group is derived from $R^1O$ group present in the solid magnesium aluminum composite or the titanium compound. When the content of $R^7O$ group in the solid catalyst component is smaller than the above-defined range, slurry polymerizability in the copolymerization of ethylene is poor, and eventually the resulting ethylene copolymer comes to have not a sufficiently narrow composition distribution. If the content of $R^7O$ group is larger than the above-defined range, catalyst component tends to decrease in activity.

The content of $R^7O$ group in the titanium catalyst component may be adjusted to the above-mentioned range by selecting the kind and amount of the titanium compound used and the temperature at which the contact of the solid magnesium aluminum composite and the titanium compound is effected. The contact temperature at which the titanium compound is brought into contact with the solid magnesium aluminum composite is usually about 0°–200° C., preferably about 20°–100° C.

In forming the above-mentioned solid product, a porous inorganic and/or organic compound may be allowed to coexist with the starting reactants in the reaction system, thereby depositing the resulting solid product on the surface of said porous compound. In this case, it is also possible that the porous compound is brought into contact in advance with the liquid magnesium compound, and the porous compound containing and retaining said liquid magnesium compound is then brought into contact with the liquid titanium compound. Examples of these useful porous compounds include silica, alumina magnesia polyolefin and these compound treated with halogen containing compound. However, when a porous compound containing aluminum, magnesium and RO group which are essential components of the present catalyst component is used in the above case, the resulting solid titanium catalyst will have sometimes the composition deviating from the preferred catalyst composition as mentioned previously.

The titanium catalyst component thus obtained is represented by the empirical formula $Mg_rAl_sTi_t(OR^7)_uX^1_v$ wherein r, s, t, u, v>0, and $X^1$ is halogen, and may optionally contain other compounds such as a silicon compound. In this titanium catalyst component, Ti/Mg (atomic ratio) is usually 0.01–0.5, preferably 0.02–0.2, Al/Mg (atomic ratio) is 0.05–1. preferably 0.08–0.5 and especially 0.12–0.3, $X^1$/Mg (atomic ratio) is 1.5–3, preferably 2–2.5, $OR^7$/Mg (weight ratio) is 0.5–15, preferably 1–10 and especially 2–6, and a specific surface area is 50–1000 m$^2$/g, preferably 150–500 m$^2$/g. Further, 10–100% of the all Ti exhibits a valence lower than Ti$^{4+}$.

The solid titanium catalyst component [A] as illustrated above may be used in combination with an organoaluminum compound catalyst component [B] in the polymerization of oelfin.

The organoaluminum compound catalyst component [B] mentioned above may be selected from among the previously exemplified alkylaluminum compounds which can be used in the preparation of the solid titanium catalyst component.

Of the alkylaluminum compounds referred to above, preferred are trialkylaluminum and alkylaluminum halide or mixtures thereof.

Polymerization of olefin with an olefin polymerization catalyst containing the solid component [A] and the component [B] as mentioned above includes not only the copolymerization of ethylene and pentene-1 but also the copolymerization of three or more components such as ethylene, pentene-1 and small amounts of other α-olefins or polyenes. Other α-olefins than ethylene and pentene-1, which are useful in this copolymerization include 2-methyl-propylene, 1-butene, 1-hexene, 4-methyl-1-pentene, 3-methyl-1-pentene, 1-octene, 1-nonene, 1-decene, 1-undecene and 1-dodecene. Further, useful polyenes include butadiene, isoprene, 1,4-hexadiene, dicyclopentadine and 5-ethylidene-2-norbonene.

The above-mentioned olefin polymerization catalyst is useful particularly when ethylene and pentene-1 are copolymerized in the vapor phase.

The polymerization reaction is carried out in the vapor phase, and this reaction can be carried out using a fluidized reactor, stirring bed reactor, stirring bed fluid reactor or tube reactor.

The solid titanium catalyst component [A] is used in powder form or after suspending it in a hydrocarbon medium or olefin, and the organoaluminum compound catalyst component [B] is fed to the polymerization system after dilution with a proper diluent or fed, as it is, to said system.

Further, the molecular weight of the resulting polymer can be controlled by feeding hydrogen to the polymerization system.

In the present invention, it is preferably to use a pre-polymerized catalyst. In carrying out the pre-polymerization, the electron donor catalyst component mentioned previously can be used in addition to the catalyst component [A] and the organoaluminum compound [B]. In that case, the amount of the electron donor catalyst component used is 0.01–30 moles, preferably 0.1–10 moles and more preferably 0.5–5 moles based on 1 gram atom of titanium present in the titanium catalyst component [A]. The pre-polymerization is to polymerize α-olefin of 2–10 carbon atoms on the catalyst in an inert hydrocarbon solvent, a liquid monomer as a solvent or in the absence of any solvent, however, the pre-polymerization carried out in the inert hydrocarbon solvent is preferred.

In the pre-polymerization, the amount of α-olefin polymerized is 0.5–5000 g, preferably 1–1000 g and more preferably 3–200 g based on 1 g of the titanium catalyst component used.

The inert hydrocarbon solvent used in the pre-polymerization includes aliphatic hydrocarbons such as propane, butane, n-pentane, iso-pentane, n-hexane, iso-hexane, n-heptane, n-octane, isooctane, n-decane, n-dodecane and kerosine; alicyclic hydrocarbons such as cyclopentane, methylcyclopentane, cyclohexane and methylcyclohexane; aromatic hydrocarbons such as benzene, toluene and xylene; and halogenated hydrocarbons such as methylene chloride, ethyl chloride, ethylene chloride and chlorobenzene. Of these hydrocarbons as exemplified above, preferred are aliphatic hydrocarbons, particularyly those of 3–10 carbon atoms.

When the inert solvent or the liquid monomer as an inert solvent is used in the pre-polymerization, the titanium catalyst component [A] is used in an amount, per 1 liter of the solvent, of 0.001–500 mmoles, preferably 0.005–200 mmoles in terms of titanium atom, and the organoaluminum compound [B] is used in such a proportion that Al/Ti (atomic ratio) is 0.5–500, preferably 1.0–50 and especially 2.0–20.

The α-olefin used in the pre-polymerization includes those having not more than 10 carbon atoms such as ethylene, propylene, 1-butene, 1-pentene, 4-methyl-1-pentene, 3-methyl-1-pentene, 1-heptene, 1-octene and 1-decene, and of these α-olefins, ethylene is particularly preferred. In carrying out the pre-polymerization, these α-olefins may be homopolymerized independently, or two or more α-olefins may be copolymerized, so long as the resulting pre-polymerized catalyst is intended to prepare crystalline polymers.

The polymerization temperature employed in the pre-polymerization varies according to the kind of α-olefin and inert hydrocarbon solvent used and cannot be defined indiscriminately, but the temperature is commonly from −40° to 80° C., preferably from −20° to 40° C. and especially from −10° to 30° C.

In the pre-polymerization, hydrogen may be allowed to coexist in the polymerization system.

Further, the pre-polymerization may be carried out by any of the batchwise and continuous methos, but the continuous method is preferred when the pre-polymerization on a large scale is required.

In the present invention, it is preferably to carry out the copolymerization of ethylene and pentene-1 with the aforementioned catalyst which has been subjected to pre-polymerization. The pre-polymerized catalyst may be fed in powder state to the vapor phase polymerizer, or said catalyst suspended in a hydrocarbon solvent as aforesaid may be fed to the polymerizer. The pre-polymerized catalyst is desirably suspended particularly in a low boiling solvent such as propane, iso-butane, n-butane or iso-pentane. By carrying out copolymerization of ethylene and pentene-1 with the olefin polymerization catalyst containing the above-mentioned pre-polymerized titanium catalyst component [A], an ethylene/pentene-1 copolymer is prepared in an amount, based on 1 g of said titanium catalyst component, of 1,000–100,000 g, preferably 2,000–50,000 g and especially 3,000–30,000 g.

In the olefin polymerization catalyst, the organoaluminum compound catalyst component [B] is used in an amount, based on 1 gram atom of titanium present in the titanium catalyst component [A], of 1–1000 moles, preferably 3–500 moles and especially 5–100 moles. Further, the olefin polymerization catalyst may also contain other compound, for example, the electron donor catalyst component. In that case, the electron donor catalyst component is used in an amount, based on 1 gram atom of the metal element present in the organoaluminum compound catalyst component [B], of not more than 100 moles, preferably not more than 1 mole and especially 0.001–0.1 mole.

The copolymerization of ethylene and pentene-1 is carried out at the polymerization temperature of 20°–130° C., preferably 50°–120° C. and especially 70°–110° C. The polymerization pressure employed at that time is 1–50 kg/cm², preferably 2–30 kg/cm² and especially 5–20 kg/cm². Further, an inert gas forming a gaseous state in the polymerization system, such as methane, ethane, propane, butane or nitrogen, may suitably fed to the polymerization system.

In carrying out the polymerization reaction, the solid titanium catalyst component [A] is used in an amount, based on 1 liter of the reaction volume, of from 0.00001 to about 1 mmol, preferably from about 0.0001 to about 0.1 mmole in terms of Ti atom.

The third ethylene/pentene-1 copolymer of the present invention is now illustrated hereinafter.

The third ethylene/pentene-1 copolymer of the invention is a random copolymer obtained by copolymerization of ethylene and pentene-1 in a suspension state in the presence of the olefin polymerization catalyst exemplified in the second process of the invention. The third ethylene/pentene-1 copolymer of the invention may be further copolymerized, in the same manner as in the case of the first and second ethylene/pentene-1 copolymer of the invention, with small amounts of other α-olefins or polyenes.

The third ethylene/pentene-1 copolymers of the present invention have a melt flow rate (MFR) of 0.01 to 100 g/10 min, preferably 0.05 to 50 g/10 min as measured according to ASTM D 1238E.

The third ethylene/pentene-1 copolymers of the present invention have a density of 0.90 to 0.96 g/cm³, preferably 0.91 to 0.95 g/cm³, more preferably 0.92 to 0.94 g/cm³, as measured according to ASTM D 1505.

The third ethylene/pentene-1 copolymers of the present invention comprise 2 to 15% by weight, preferably 3 to 12% by weight, particularly preferably 4 to 10% by weight of a constitution unit derived from pentene-1 and 85 to 98% by weight, preferably 88 to 97% by weight, particularly preferably 90 to 96% by weight of a constitution unit derived from ethylene.

The third ethylene/pentene-1 copolymers may contain not more than 5% by weight, preferably not more than 3% by weight, particularly preferably not more than 2% by weight of a constitution unit derived from one or more α-olefins or polyenes in addition to ethylene and pentene-1 as mentioned above.

The DSC melt-peak pattern of ultra-slowly cooled sample of the third ethylene/pentene-1 copolymer of the present invention has two melt-peaks and the relationship between the ratio of Hh/Hl (wherein Hh is a peak height on the higher temperature side and Hl is a peak height on the lower temperature side) and the density (d) of the copolymer fulfills the following formula [11].

$$60d - 52.0 < Hh/Hl < 80d - 69.0 \qquad [11]$$

Preferably, $$60d - 52.0 < Hh/Hl < 80d < 69.1 \qquad [11']$$

Particularly preferably, $$60d < 51.9 < Hh/Hl < 80d < 69.2 \qquad [11'']$$

wherein Hh represents a peak height on the higher temperature side, Hl represents a peak height on the lower temperature side, and d is the density of the copolymer.

The ratio (RS) of the impact strength of a film of 40 μm in thickness to the tear strength thereof in the take-off direction is represented by the following formula [12], said film being obtained by casting the ethylene/pentene-1 copolymer having the above-mentioned characteristics according to the present invention.

$$RS \geq -20 \log MFR - 1000d + 968 \qquad [12]$$

wherein MFR is the melt flow rate of the copolymer and d is the density of the copolymer.

Preferably, $$RS \geq -20 \log MFR - 1000d + 973 \qquad [12']$$

Particularly preferably, $$200 \geq RS \geq -20 \log MFR - 1000d + 975 \qquad [12'']$$

When the ratio (RS) of the impact strength to the tear strength is lower than (−20 log MFR − 1000d + 968), the resulting film has poor tear properties, though it has a high impact strength, or the resulting film is inferior in impact strength, though it has good tear properties. The film of 40 μm in thickness, used for the measurement of the RS value, is a film prepared by molding the ethylene/pentene-1 copolymer under the following conditions into a film by using a T-die film molding machine equipped with a 65 mmφ extruder.

Molding conditions:
Resin temperature: 220° to 240° C.

Chill roll temperature: 30° to 40° C.
Film-forming rate: 20 to 40 m/min
Draft ratio (film thickness/lip opening): 0.05 to 0.07

Other physical properties of the third ethylene/pentene-1 copolymer of the present invention, such as an impact strength, a tear strength (TMD)-melt flow rate (MFR) relationship, a stress crack resistance (ESCR) of the film resulting from said copolymer, and a haze (HAZE)-melt flow rate (MFR) relationship of said copolymer, are preferably similar to those of the second ethylene/pentene-1 copolymer of the invention.

The third ethylene/pentene-1 copolymer of the invention as illustrated above may be prepared by the third process for the preparation of the ethylene/pentene-1 copolymer according to the invention as will be mentioned below in detail.

In the third process for the preparation of the ethylene/pentene-1 copolymer according to the invention, ethylene and pentene-1 are copolymerized using a catalyst, for example, the olefin polymerization catalyst used in the second process of the invention mentioned previously. The copolymerization of ethylene and pentene-1 in the third process of the invention is carried out preferably in the presence of the aforementioned pre-polymerized catalyst. In this copolymerization, it is preferable to use the titanium catalyst component [A] of the pre-polymerized catalyst in an amount, based on 1 liter of the polymerization solvent, of from 0.0001 to about 1 mmole, preferably from about 0.001 to about 0.1 mmole in terms of Ti atom. Through the copolymerization mentioned above, an ethylene/pentene-1 copolymer is prepared in an amount, based on 1 g of the titanium catalyst component [A], of 1000–100,000 g, preferably 2,000–50,000 g and especially 3,000–30,000 g.

In that case, it is preferable to use the organoaluminum compound catalyst component [B] in an amount, based on 1 gram atom of titanium present in the titanium catalyst component [A], of 1–1000 moles, preferably 3–500 moles and especially 5–100 moles. The pre-polymerized catalyst used may contain other compounds, for example, an electron donor catalyst component in an amount, based on 1 gram atom of the metal element present in the organoaluminum compound catalyst component [B], of not more than 100 moles, preferably not more than 1 mole and especially 0.001–0.1 mole.

The polymerization temperature employed in this case is 20°–130° C., preferably 50°–120° C. and especially 70°–110° C., and the polymerization pressure is 1–50 kg/cm$^2$, preferably 2–30 kg/cm$^2$ and especially 5–20 kg/cm$^2$. Further, an inert gas forming a gaseous state in the polymerization system, such as methane, ethane, propane, butane or nitrogen, may suitably fed to the system.

In the third process for the preparation of the ethylene/pentene-1 copolymer according to the invention, ethylene and pentene-1 are copolymerized in a suspension state in the presence of an olefin polymerization catalyst containing, for example, at least one solid catalyst component as mentioned above, and the copolymerization reaction is carried out in the presence of a liquid medium used in an amount of more than the weight of the copolymer obtained in the steady state, and at the state where more than 30% by weight of said copolymer will not be eluted into said liquid medium.

The liquid medium referred to above, which is used in an amount of more than the weight of the copolymer obtained in the steady state, is intended to designate a solvent used as a dispersant to disperse the above-mentioned solid substance, for example, a catalyst supported by a solid carrier of a solid catalyst component, or used as a polymerization reaction solvent. This liquid medium includes, for example, alphatic hydrocarbon such as propane, iso-butane, n-butane, iso-pentane, n-pentane, iso-hexane, n-hexane, iso-heptane, n-heptane, iso-octane, n-octane, iso-decane, n-decane, dodecane or kerosine, and halogen derivatives thereof; alicyclic hydrocarbon such as cyclopentane, cyclohexane, methylcyclopentane, or methylcyclohexane, and halogen derivatives thereof; aromatic hydrocarbon such as benzene, toluene or xylene, and a halogen derivative thereof such as chlorobenzene.

The third process for the preparation of the ethylene/pentene-1 copolymer according to the invention is carried out in the presence of the catalyst and liquid medium as mentioned above at such a state that more than 30% by weight, preferably 0–10% by weight of the copolymer obtained in the steady state will not be eluted into said liquid medium.

When the copolymerization reaction is carried out at the state where more than 30% by weight of the copolymer obtained in the steady state will be eluted into the liquid medium, it becomes difficult to continue the polymerization reaction without interruption.

The above-mentioned first, second and third ethylene/pentene-1 copolymers having aforesaid properties are excellent in transparency, impact resistance, tear resistance, blocking resistance, low-temperature heat sealing properties, heat resistance and stress crack resistance and these excellent properties are well-balanced so that the copolymers are suitable for use in the preparation of packaging films in particular. In addition to being used as packaging film materials, the copolymers can be processed into various molded articles such as containers, articles for daily use, pipes and tubes by T-die molding, inflation molding, blow molding, injection molding and extrusion. Further, the copolymers can be extrusion-coated on other film or co-extruded together with other film to prepare various composite films. Furthermore, the copolymers can be used in the fields of steel pipe coating materials, wire coating materials and expansion-molded articles. In addition, the copolymers can be used as blends with other thermoplastic resins such as polyolefins, for example, high-density polyethylene, medium-density polyethylene, polypropylene, poly(1-butene), poly(4-methyl-1-pentene), low-crystalline to non-crystalline copolymers of ethylene and propylene or 1-butene and propylene/1-butene copolymers.

If desired, heat stabilizers, weathering stabilizers, antistatic agents, anti-blocking agents, slip agents, nucleating agents, pigments, dyes and inorganic or organic fillers may be blended with the above-mentioned ethylene/pentene-1 copolymers.

The ethylene/pentene-1 copolymer compositions of the present invention are illustrated below.

The ethylene/pentene-1 copolymer compositions of the present invention comprise an ethylene/pentene-1 copolymer and at least the compound selected from the group consisting of the following compounds (a) to (e).
(a) Phenolic stabilizer
(b) Organic phosphite stabilizer
(c) Thioether stabilizer
(d) Hindered amine stabilizer
(e) Metal salt of higher aliphatic acid.

As the ethylene/pentene-1 copolymers used in the compositions of the present invention, however it is not especially limited, the aforesaid first, second and third ethylene/pentene-1 copolymers are used. These ethylene/pentene-1 copolymers are used singly or in combination.

The ethylene/pentene-1 copolymer used in the compositions according to the present invention are preferably manufactured by the above-described processes according to the present invention for preparing the ethylene/pentene-1 copolymer.

The compositions according to the present invention comprise the above-mentioned ethylene/pentene-1 copolymer and at least one compound selected from the group consisting of the compounds denoted by (a) to (e) mentioned above.

These compounds are illustrated hereinafter.

Phenolic Stabilizers (a)

Though conventionally known phenolic compounds are used as phenolic stabilizers without specific restriction, concrete examples of the phenolic stabilizers include
2,6-di-tert-butyl-4-methylphenol,
2,6-di-tert-butyl-4-ethylphenol,
2,6-dicyclohexyl-4-methylphenol,
2,6-diisopropyl-4-ethylphenol,
2,6-di-tert-amyl-4-methylphenol,
2,6-di-tert-octyl-4-n-propylphenol,
2,6-dicyclohexyl-4-n-octylphenol,
2-isopropyl-4-methyl-6-tert-butylphenol,
2-tert-butyl-2-ethyl-6-tert-octylphenol,
2-isobutyl-4-ethyl-6-tert-hexylphenol,
2-cyclohexyl-4-n-butyl-6-isopropylphenol,
dl-α-tocopherol,
tert-butylhydroquinone,
2,2'-methylenebis(4-methyl-6-tert-butylphenol),
4,4'-butylidenebis(3-methyl-6-tert-butylphenol),
4,4'-thiobis(3-methyl-6-tert-butylphenol),
2,2-thiobis(4-methyl-6-tert-butylphenol),
4,4'-methylenebis(2,6-di-tert-butylphenol),
2,2'-methylenebis[6-(1-methylcyclohexyl)-p-cresol],
2,2'-ethylidenebis(2,4-di-tert-butylphenol),
2,2'-butylidenebis(2-tert-butyl-4-methylphenol),
1,1,3-tris(2-methyl-4-hydroxy-5-tert-butylphenyl)butane,
triethylene glycol bis[3-(3-tert-butyl-5-methyl-4-hydroxyphenyl)propionate],
1,6-hexanediol bis[3-(3,5-di-tert-butyl-4-hydroxyphenyl)propionate],
2,2'-thiodiethylenebis[3-(3,5-di-tert-butyl-4-hydroxyphenyl)propionate],
N,N'-hexamethylenebis(3,5-di-tert-butyl-4-hydroxyhydrocinnamamide),
3,5-di-tert-butyl-4-hydroxybenzyl phosphonate diethyl ester,
1,3,5-tris(2,6-dimethyl-3-hydroxy-4-tert-butylbenzyl) isocyanurate,
1,3,5-tris[(3,5-di-tert-butyl-4-hydroxyphenyl)propionyloxyethyl] isocyanurate,
tris(4-tert-butyl-2,6-dimethyl-3-hydroxybenzyl) isocyanurate,
2,4-bis(n-octylthio)-6-(4-hydroxy-3,5-di-tert-butylanilino)-1,3,5-triazine,
tetrakis[methylene 3-(3,5-di-tert-butyl-4-hydroxyphenyl)propionate]methane,
bis(3,5-di-tert-butyl-4-hydroxybenzylphosphonic acid ethyl ester) calcium,
bis(3,5-di-tert-butyl-4-hydroxybenzylphosphonic acid ethyl ester) nickel,
bis[3,3-bis(3-tert-4-hydroxyphenyl)butyric acid] glycol ester,
N,N'-bis[(3,5-di-tert-butyl-4-hydroxyphenyl)propionyl]hydrazine,
2,2'-oxamidobis[ethyl-3-(3,5-di-tert-butyl-4-hydroxyphenyl)propionate],
2,2'-methylenebis(4-methyl-6-tert-butylphenol) terephthalate,
1,3,5-trimethyl-2,4,6-tris(3,5-di-tert-butyl-4-hydroxybenzyl)benzene,
3,9-bis[1,1-dimethyl-2-{β-(3-tert-butyl-4-hydroxy-5-methylphenyl)propionyloxy}ethyl]-2,4,8,10-tetraoxaspiro[5,5]undecane,
2,2-bis[4-(2-(3,5-di-tert-butyl-4-hydroxyhydrocinnamoyloxy))ethoxyphenyl]propane, and
alkyl esters of β-(3,5-di-tert-butyl-4-hydroxyphenyl)propionic acid.

Of these compounds, preferred are
triethylene glycol bis[3-(3-tert-butyl-5-methyl-4-hydroxyphenyl)propionate],
1,6-hexanediol bis[3-(3,5-di-tert-butyl-4-hydroxyphenyl)propionate],
2,2-thiodiethylenebis[3-(3,5-di-tert-butyl-4-hydroxyphenyl)propionate],
N,N'-hexamethylenebis(3,5-di-tert-butyl-4-hydroxyhydrocinnamamide),
3,5-di-tert-butyl-4-hydroxybenzyl phosphonate diethyl ester,
1,3,5-tris(2,6-dimethyl-3-hydroxy-4-tert-butylbenzyl) isocyanurate,
1,3,5-tris[(3,5-di-tert-butyl-4-hydroxyphenyl)propionyloxyethyl] isocyanurate,
tris(4-tert-butyl-2,6-dimethyl-3-hydroxybenzyl) isocyanurate,
2,4-bis(n-octylthio)-6-(4-hydroxy-3,5-di-tert-butylanilino)-1,3,5-triazine,
tetrakis[methylene 3-(3,5-di-tert-butyl-4-hydroxyphenyl)propionate]methane,
bis(3,5-di-tert-butyl-4-hydroxybenzylphosphonic acid ethyl ester) calcium,
bis(3,5-di-tert-butyl-4-hydroxybenzylphosphonic acid ethyl ester) nickel,
bis[3,3-bis(3-tert-4-hydroxyphenyl)butyric acid]glycol ester,
N,N'-bis[(3,5-di-tert-butyl-4-hydroxyphenyl)propionyl]hydrazine,
2,2'-oxamidobis[ethyl-3-(3,5-di-tert-butyl-4-hydroxyphenyl)propionate],
2,2'-methylenebis(4-methyl-6-tert-butylphenol) terephthalate,
1,3,5-trimethyl-2,4,6-tris(3,5-di-tert-butyl-4-hydroxybenzyl)benzene,
3,9-bis[1,1-dimethyl-2-{β-(3-tert-butyl-4-hydroxy-5-methylphenyl)propionyloxy}ethyl]-2,4,8,10-tetraoxaspiro[5,5]undecane,
2,2-bis[4-(2-(3,5-di-tert-butyl-4-hydroxyhydrocinnamoyloxy))ethoxyphenyl]propane, and
alkyl esters of β-(3,5-di-tert-butyl-4-hydroxyphenyl)propionic acid.

Of the alkyl esters of β-(3,5-di-tert-butyl-4-hydroxyphenyl)propionic acid mentioned above, particularly preferred are alkyl esters having alkyl group of not greater than 18 carbon atoms.

Furthermore, the following compounds are particularly preferably used in the present invention:

tetrakis[methylene 3-(3,5-di-tert-butyl-4-hydroxyphenyl)propionate]methane, bis(3,5-di-tert-butyl-4-hydroxybenzylphosphonic acid ethyl ester) calcium, bis(3,5-di-tert-butyl-4-hydroxybenzylphosphonic acid ethyl ester) nickel, bis[3,3-bis(4-hydroxy-3-tert-butylphenyl)butyric acid]glycol ester, N,N'-bis[(3,5-di-tert-butyl-4-hydroxyphenyl)propionyl]hydrazine, 2,2'-oxamidobis[ethyl-3-(3,5-di-tert-butyl-4-hydroxyphenyl)propionate], 2,2'-methylenebis(4-methyl-6-tert-butylphenol) terephthalate, 1,3,5-trimethyl-2,4,6-tris(3,5-di-tert-butyl-4-hydroxybenzyl)benzene, 3,9-bis[1,1-dimethyl-2-{β-(3-tert-butyl-4-hydroxy-5-methylphenyl)propionyloxy}ethyl]-2,4,8,10-tetraoxaspiro[5,5]undecane, 1,3,5-tris[(3,5-di-tert-butyl-4-hydroxyphenyl)propionyloxyethyl]isocyanurate, and 2,2-bis[4-(2-(3,5-di-tert-butyl-4-hydroxyhydrocinnamoyloxy))ethoxyphenyl]propane.

These phenolic stabilizers are used singly or in combination.

Organic Phosphite Stabilizers (b)

Though conventionally known organic phosphite stabilizers are used without specific restriction in the present invention, concrete examples of the organic phosphite stabilizers include trioctyl phosphite, trilauryl phosphite, tridecyl phosphite, octyl diphenyl phosphite, tris(2,4-di-tert-butylphenyl) phosphite, triphenyl phosphite, tris(butoxyethyl) phosphite, tris(nonylphenyl) phosphite, distearylpentaerithrytol diphosphite, tetra(tridecyl)-1,1,3-tris(2-methyl-5-tert-butyl-4-hydroxyphenyl)butane diphosphite, tetra($C_{12}$-$C_{15}$ mixed alkyl)-4,4'-isopropylidenediphenyl diphosphite, tetra(tridecyl)-4,4'-butylidenebis(3-methyl-6-tert-butylphenol) diphosphite, tris(3,5-di-tert-butyl-4-hydroxyphenyl) phosphite, tris(mixed mononylphenyl, dinonylphenyl) phosphite, hydrogenated-4,4'-isopropylidenediphenol polyphosphite, bis(octylphenyl) bis[4,4'-butylidenebis(3-methyl-6-tert-butylphenol)] 1,6-hexanediol diphosphite, phenyl 4,4'-isopropylidenediphenol pentaerythritol diphosphite, tris[4,4'-isopropylidenebis(2-tert-butylphenol)] phosphite, phenyl diisodecyl phosphite, di(nonylphenyl) pentaerythritol diphosphite, tris(1,3-distearoyloxyisopropyl) phosphite, 4,4'-isopropylidenebis(2-tert-butylphenol) di(nonylphenyl) phosphite, and 9,10-dihydro-9-oxa-9-oxa-10-phosphaphenanthrene-10-oxide.

In addition, bis(dialkylphenyl) pentaerythritiol diphosphite esters having the formula (1) of spiro type or the formula (2) of cage type illustrated below are also used:

Usually, a mixture of both isomers is most often used due to utilization of an economically advantageous process for manufacturing such phosphite ester.

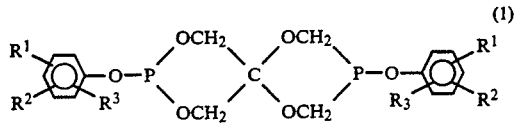
(1)

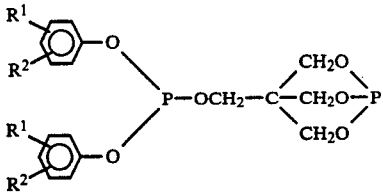
(2)

wherein $R^1$, $R^2$ and $R^3$ are each a hydrogen or an alkyl group having 1 to 9 carbon atoms, preferably a branched alkyl group, particularly preferably a tert-butyl group, the most preferable substitution positions of $R^1$, $R^2$ and $R^3$ on the phenyl groups being 2-, 4- and 6-positions. Preferable phosphite esters include bis(2,4-di-tert-butylphenyl)pentaerythritol diphosphite and bis(2,6-di-tert-butyl-4-methylphenyl)pentaerythritol diphosphite, and there may also be mentioned phosphonites having a structure wherein a carbon atom is directly bonded to a phosphorus atom, such as tetrakis(2,4-di-tert-butylphenyl)-4,4'-biphenylene diphosphonite.

These organic phosphite stabilizers are used singly or in combination.

Thioether Stabilizers (c)

Though conventionally known thioether stabilizers are used without specific restriction in the present invention, concrete examples of the thioether stabilizers include dialkyl esters such as dilauryl, dimyristyl and distearyl ester of thiodipropionic acid, esters of alkylthiopropionic acid such as butyl-, octyl-, lauryl- and stearylthiopropionic acid with a polyhydric alcohol (for example, glycerine, trimethylolethane, trimethylolpropane, pentaerythritol and trishydroxyethyliscyanurate), such as pentaerythritoltetralaurylthiopropionate. More concretely, the thioether stabilizers include dilauryl thiodipropionate, dimyristyl thiodipropionate, lauryl stearyl thiodipropionate and distearyl thiodibutyrate.

These thioether stabilizers are used singly or in combination.

Hindered Amine Stabilizers (d)

There are used without specific restriction as the hindered amine stabilizers conventionally known compounds having a structure wherein methyl groups are substituted for all the hydrogen atoms bonded to the carbon atoms at the 2-and 6-positions of piperidine. Concrete examples of the hindered amine stabilizers include (1) bis(2,2,6,6-tetramethyl-4-piperidyl) sebacate,
(2) dimethyl succinate-1-(2-hydroxyethyl)-4-hydroxy-2,2,6,6-tetramethylpiperidine polycondensate,
(3) poly[[6-(1,1,3,3-tetramethylbutyl)imino-1,3,5-triazine-2,4-diyl][(2,2,6,6-tetramethyl-4-piperidyl)imino]-hexamethylene[(2,2,6,6-tetramethyl-4-piperidyl)imino]],
(4) tetrakis(2,2,6,6-tetramethyl-4-piperidyl) 1,2,3,4-butanetetracarboxylate,
(5) 2,2,6,6-tetramethyl-4-piperidyl benzoate
(6) bis(1,2,6,6-pentamethyl-4-piperidyl)-2-(3,5-di-tert-butyl-4-hydroxybenzyl)-2-n-butyl malonate,
(7) bis-(N-methyl-2,2,6,6-tetramethyl-4-piperidyl) sebacate,
(8) 1,1'-(1,2-ethanediyl)bis(3,3,5,5-tetramethylpiperazinone), (9) (mixed 2,2,6,6-tetramethyl-4-piperidyl/tridecyl) 1,2,3,4-butanetetracarboxylate,
(10) (mixed 1,2,2,6,6-pentamethyl-4-piperidyl/tridecyl) 1,2,3,4-butanetetracarboxylate,
(11) mixed {2,2,6,6-tetramethyl-4-piperidyl/$\beta,\beta,\beta',\beta'$-tetramethyl-3,9-[2,4,8,10-tetraoxaspirio(5,5)undecane]diethyl} 1,2,3,4-butanetetracarboxylate,
(12) mixed {1,2,2,6,6-pentamethyl-4-piperidyl/$\beta,\beta,\beta',\beta'$-tetramethyl-3,9-[2,4,8,10-tetraoxaspiro(5,5)undecane]diethyl} 1,2,3,4-butanetetracarboxylate,
(13) N,N'-bis(3-aminopropyl)ethylenediamine-2,4-bis[N-butyl-N-(1,2,2,6,6-pentamethyl-4-piperidyl)amino]-6-chloro-1,3,5-triazine condensate,
(14) poly[[6-N-morpholinyl-1,3,5-triazine-2,4-diyl]-[(2,2,6,6-tetramethyl-4-piperidyl)imino]hexamethylene[(2,2,6,6-tetramethyl-4-piperidyl)imino]],
(15) condensate of N,N'-bis(2,2,6,6-tetramethyl-4-piperidyl)hexamethylenediamine with 1,2-dibromoethane, and
(16) [N-(2,2,6,6-tetramethyl-4-piperidyl)-2-methyl-2-(2,2,6,6-tetramethyl-4-piperidyl)imino]propionamide.

Of the hindered amine stabilizers, those especially preferably employed are the compounds denoted by (1), (2), (3), (4), (8), (10), (11), (14) and (15).

These hindered amine stabilizers are used singly or in combination.

Metal Salts of Higher Aliphatic Acid (e)

Examples of methal salts of the higher aliphatic acid which may be used in the invention include alkaline earth metal salts such as magnesium salts, calcium salts and barium salts, alkali metal salts such as sodium salts, potassium salts and lithium salts, cadmium salts, zinc salts and lead salts of higher aliphatic acids such as stearic acid, oleic acid, lauric acid, capric acid, ariachidic acid, palmitic acid, behenic acid, 12-hydroxystearic acid, ricinolic acid, and montanic acid. Concrete examples of the higher aliphatic acid metal salts include magnesium stearate, magnesium laurate, magnesium palmitate, calcium stearate, calcium oleate, calcium laurate, barium stearate, barium oleate, barium laurate, barium arachidate, barium behenate, zinc stearate, zinc oleate, zinc laurate, lithium stearate, sodium stearate, sodium palmitate, sodium laurate, potassium stearate, potassium laurate, calcium 12-hydroxystearate and calcium montanate and zinc montanate.

These higher aliphatic acid metal salts are used singly or in combination.

Higher aliphatic acid metal salts as described above act as a lubricant and a rust-preventive agent. Ethylene/pentene-1 compolymer compositions containing such higher aliphatic acid metal salts therefore are excellent in moldability and effective in rust prevention of molding machines, etc.

Furthermore, when a higher aliphatic acid metal salt as described above in an amount as described below is added to an ethylene/pentene-1 copolymer or an ethylene/pentene-1 copolymer composition, the metal salt is capable of sufficiently absorbing residual chlorine originating from the catalyst for the above-mentioned copolymer. Accordingly, resin obtained from the copolymer or the copolymer composition does not show deterioration of its characteristics.

Preferable examples of the compositions according to the present invention include (1) a composition comprising an ethylene/pentene-1 copolymer in an amount of 100 parts by weight, and
a phenolic stabilizer (a) in the amount of 0.005 to 5 parts by weight, preferably 0.005 to 2 parts by weight, more preferably 0.01 to 1 part by weight;

(2) a composition comprising
an ethylene/pentene-1 copolymer in an amount of 100 parts by weight,
a phenolic stabilizer (a) in an amount of 0.005 to 5 parts by weight, preferably 0.005 to 2 parts by weight, more preferably 0.01 to 1 part by weight, and at least one compound selected from the group consisting of
(b) organic phosphite stabilizers,
(c) thioether stabilizers,
(d) hindered amine stabilizers and
(e) higher aliphatic acid metal salts
in an amount of 0.005 to 5 parts by weight, preferably 0.005 to 2 parts by weight, more preferably 0.01 to 1 part by weight;

(3) a composition comprising
an ethylene/pentene-1 copolymer in an amount of 100 parts by weight, and
an organic phosphite stabilizer (b) in an amount of 0.005 to 5 parts by weight, preferably 0.005 to 2 parts by weight, more preferably 0.01 to 1 part by weight;

(4) a composition comprising
an ethylene/pentene-1 copolymer in an amount of 100 parts by weight,
an organic phosphite stabilizer (b) in an amount of 0.005 to 5 parts by weight, preferably 0.005 to 2 parts by weight, more preferably 0.01 to 1 part by weight, and
at least one compound selected from the group consisting of
(c) thioether stabilizers,
(d) hindered amine stabilizers and
(e) higher aliphatic acid metal salts
in an amount of 0.005 to 5 parts by weight, preferably 0.005 to 2 parts by weight, more preferably 0.01 to 1 part by weight;

(5) a composition comprising
an ethylene/pentene-1 copolymer in an amount of 100 parts by weight, and
a thioether stabilizer (c) in an amount of 0.005 to 5 parts by weight, preferably 0.005 to 2 parts by weight, more preferably 0.01 to 1 part by weight;

(6) a composition comprising
an ethylene/pentene-1 copolymer in an amount of 100 parts by weight,
a thioether stabilizer (c) in an amount of 0.005 to 5 parts by weight, preferably 0.005 to 2 parts by weight, more preferably 0.01 to 1 part by weight, and
at least one compound selected from the group consisting of
(d) hindered amine stabilizers and
(e) higher aliphatic acid metal salts
in an amount of 0.005 to 5 parts by weight, preferably 0.005 to 2 parts by weight, more preferably 0.01 to 1 part by weight;

(7) a composition comprising
an ethylene/pentene-1 copolymer in an amount of 100 parts by weight, and
a hindered amine stabilizer (d) in an amount of 0.005 to 5 parts by weight, preferably 0.005 to 2 parts by weight, more preferably 0.01 to 1 part by weight;

(8) a composition comprising
  an ethylene/pentene-1 copolymer in an amount of 100 parts by weight,
  a hindered amine stabilizer (d) in an amount of 0.005 to 5 parts by weight, preferably 0.005 to 2 parts by weight, more preferably 0.01 to 1 part by weight, and a higher aliphatic acid metal salt (e) in an amount of 0.005 to 5 parts by weight, preferably 0.005 to 2 parts by weight, more preferably 0.01 to 1 part by weight; and
(9) a composition comprising
  an ethylene/pentene-1 copolymer in an amount of 100 parts by weight, and
  a higher aliphatic acid metal salt (e) in an amount of 0.005 to 5 parts by weight, preferably 0.005 to 2 parts by weight, more preferably 0.01 to 1 part by weight.

When these stabilizers are added in the amount range as described above to 100 parts by weight of the ethylene/pentene-1 copolymer, the resultant compositions of the invention show highly improved thermal resistance at low cost of the stabilizers without deteriorating the resin properties such as tensile strength.

The ethylene/pentene-1 copolymer compositions according to the present invention may be incorporated with such compounding agents usually added to and mixed with polyolefins as diluents, heat-resistant stabilizers, weather-resistant stabilizers, pigments, dyes, lubricants and antistatic agents in addition to the above-described components so long as the incorporation does not impair the object of the invention.

EFFECT OF THE INVENTION

The ethylene/pentene-1 copolymers of the present invention fulfill aforementioned specific requisites, so that when the copolymer is molded into a film, the obtained film has a good balance between impact resistance and tear properties. Further, the film formed from the copolymer shows high SC resistance and has haze development of extremely low level. Accordingly, the ethylene/pentene-1 copolymer of the invention can be favorably applied to various uses.

In the processes for the preparation of an ethylene/pentene-1 copolymer according to the invention, the polymerization reaction is performed under the aforementioned specific conditions. Therefore, when a copolymer prepared by the processes is molded into a film, the obtained film has a good balance between impact resistance and tear properties. Further, the film shows high SC resistance and has haze development of extremely low level. Accordingly, the ethylene/pentene-1 copolymer prepared by the processes of the invention can be favorably applied to various uses.

The ethylene/pentene-1 copolymer composition of the invention is excellent in heat stability in the molding stage, long-term heat stability and weatherability. Further, the ethylene/pentene-1 copolymer composition hardly suffers heat deterioration when the composition is formed into a molded product such as a film, so that the composition of the invention can be employed for forming a molded product having high impact strength and good tear properties.

EXAMPLE

The present invention is further described by the following Examples, but the Examples are by no means given to restrict the invention.

The stabilizers used in the Examples are listed as follows, and estimation of the stabilities of films are measured by the following methods.

USED STABILIZERS

Phenolic Stabilizers

A: Stearyl ester of β-(3,5-di-tert-butyl-4-hydroxyphenyl)-propionic acid. (trade name; Irganox 1076, from Nippon Ciba Geigy, Co.)

B: Tetrakis[methylene-3-(3,5-di-tert-butyl-4-hydroxyphenyl)propionate]methane (trade name; Irganox 1010, from Nippon Ciba Geigy, Co.)

Organic Phosphite Stabilizers

C: Tris (2,4-di-tert-butylphenyl) phosphite (trade name; Phosphite 168, from Nippon Ciba Geigy, Co.)

D: Tetrakis (2,4-di-tert-butylphenyl)-4,4'-biphenylene diphosphonite (trade name; Sandostab P-EPQ, from Sandoz, Co.)

Thioether Stabilizers

E: Dilauryl thiodipropionate (trade name; Antiox L, from Nippon Yusi, Co.)

F: Distearyl thiodipropionate (trade name; DSTP"Yoshitomi", from Yoshitomi Pharmacy, Co.)

G: Pentaerythritol tetra β-mercapto laurylthiopropionate (trade name: Seenox 412S, from Shipro Chemical, Co.)

Hindered Amine Stabilizers

H: Bis (2,2,6,6-tetramethyl-4-piperidyl) sebacate (trade name: Sanol LS770, from Sankyo, Co.)

I: Poly[[6-(1,1,3,3-tetramethylbutyl)imino-1,3,5-triazine-2,4-diyl][(2,2,6,6-tetramethyl-4-piperidyl)imino]hexamethylene [(2,2,6,6-tetramethyl-4-piperidyl)imino]] (trade name; Chimassorb 944LD, from Nippon Ciba Geigy, Co.)

Metal Salts of Higher Aliphatic Acid

J: Calcium stearate
K: Calcium 12-hydroxystearate
L: Magnesium Stearate
M: Calcium montanate Measurement Method MFR: An MFR is measured in accordance with ASTM D 1238 under 2.16 kg load at 190° C.

Impact Strength: An impact strength is measured in accordance with JIS P8134, which states in pertinent part:

JAPANESE INDUSTRIAL STANDARD   J I S

Testing Method for Puncture of Paperboard   P 8134-1986 (Reaffirmed: 1984)

1. Scope

This Japanese Industrial Standard specifies the testing method ([1]) for puncture of paperboard and corrugated board.

Note ([1]) The testing method for puncture is intended to measure the amount of work necessary for the piercing part of the tester with the certain specified shape and dimensions to perforate the test piece by impact.

Remark: In this standard, the particulars in {} are in accordance with the International System of Units (SI) and given for reference only.

2. Apparatus

The testing apparatus shall be provided with the following components.

(1) Pendulum which has a 90° arc-shaped arm to which the piercing part can be attached and can be swung freely (2) Piercing part which is a right-angle trigonal pyramid of 25.4 mm in height which has a luster of mirror surface, can be firmly attached to the end of the arc-shaped arm and has edges which are curved with the radius of curvature of 1.5 mm
(3) Metallic collar which is constructed to slightly deflect so that the arm of the pendulum is protected from friction due to spring-returning of the test piece after the piercing part perforates the test piece.
(4) Device capable of horizontally supporting the pendulum and releasing it.
(5) Test piece clamp plate which properly clamps the test piece at the horizontal position.
(6) Pointer and dial which indicate the maximum arc movement of the pendulum after the test piece is perforated by the piercing part.
(7) Auxiliary weight and fixture to be attached to the pendulum which is capable of measuring the amount of work necessary for perforation up to at least 400 kgf·cm{39.2 J}.
(8) Inserting plate which has an opening of equilateral triangle of which one side is 106 mm in length and the vertex is curved with the 3 mm radius and can be inserted between the clamp plates to fix the tested part and removed for adjusting the machine 3. Adjustment The testing apparatus shall be placed horizontally and adjusted as described below.
(1) Zero adjustment of the scales shall be conducted by removing the inserting plate, setting the tip of the pointer to a position approx. 25 mm higher than the zero line on the scale and swinging the pendulum. In this case, the metallic collar shall be left as is attached. Repeat the operation several times to ascertain that the pendulum causes the pointer to swing to the zero point.
When the pointer does not accurately indicate at the zero point, adjust the adjust screw for the pointer.
(2) Check the pointer for friction as follows. In other words, set the point to the highest position of the scale before the pendulum is released and check whether the tip of the pointer comes to within 3 mm from the zero line after the pendulum is released.
(3) When the reading is 3 mm or over, the pointer has excessive friction and therefore the shaft of the pointer should be lubricated or the friction spring should be loosened.
(4) The testing apparatus shall be corrected referring to 4. in JIS P 8116.

4. Test Piece

The test piece shall be 150 mm² or over in dimensions and clamped so that the test piece does not slip between the clamp plates. The perforating position shall be at least 40 mm away from a part considered detrimental to the test. The test piece shall be adjusted to comply with the requirements specified in JIS P 8111 before the test.

5. Procedure (1) The test shall be conducted in the atmosphere conforming to the requirements specified in JIS P 8111.
(2) Hold the test piece correctly between the clamp plates, mount the metallic collar onto the base of the piercing part, set the pointer to a position where the tip of the pointer is approx. 25 mm higher than a reading position expected in the test and release the pendulum. Read the pointer after the pendulum is stopped. The scale as much as 25% of the scale angle from the maximum scale point should not be used.
(3) The test shall be conducted so that one edge of the trigonal pyramid of the piercing part is positioned in the longitudinal direction of the test piece in case of the paperboard and in the corrugating direction in case of the corrugated board and the test shall further be conducted in the direction at right angles to the above directions.
(4) The test shall be conducted at least five times in each direction.

6. Report

The valves obtained from the test piece with respect to each direction shall be expressed by three significant digits in kgf·cm {J} in accordance with JIS Z 8401 and reported as follows:
(1) Overall mean value
(2) Mean value, maximum value and minimum value with respect to each direction
(3) Number of times of tests for each direction.

The content of constitution unit derived from pentene-1

1) Teflon tape is laminated on 0.2 g of ethylene/pentene-1 copolymer. A hot plate is then placed on the laminate and is then transferred to a hot press adjusted to 180°±2° C. to form a film having a thickness of 100 μ to 200 μ.

The thus obtained film is subjected to infrared spectral analysis at a wave length between 1420 cm$^{-1}$ and 1300 cm$^{-1}$ using A-302 type infrared (IR) spectrophotometer (manufactured by Nippon Bunko K. K., Japan). Absorbance(D) per unit thickness (μ) assigned to methyl symmetric angular vibration at 1378 cm$^{-1}$ is measured. The branch number derived from pentene-1 is calculated from an analytical curve.

The branch number (N/1000 carbon atoms) is determined by the following formula(1):

$$N = 7.77 \times (D) - 3.73 \qquad (1).$$

The content of pentene-1(mol %) is calculated from the branch number (N/1000 carbon atoms) by the following formula(2):

$$\text{Comonomer(mol \%)} = 200 \times N/(1000 - 3N) \qquad (2).$$

The analytical curve is prepared by using a standard sample determined from the amount of comonomer by $^{13}$C-NMR analysis as described below.

(2) (i) Preparation of test sample: 0.35 g of ethylene/pentene-1 copolymer is added to 2 ml of hexachlorobutadiene and dissolved by heating. To the resultant solution is added 0.5 ml of deuterium benzene and then charged to a nuclear magnetic resonance (NMR) tube having an inner diameter of 10 mm, thereby preparing a test sample.

(ii) Measurement: The thus prepared test sample is subjected to $^{13}$C-NMR analysis at 120° C. using FX-100 type NMR measurement apparatus (manufactured by NIHON DENSHI K.K., Japan). The number of integrating is 20,000 or more.

The content of constitution unit derived from pentene-1 (mol fraction) is defined by the following formula according to the methods of Bovey, et al. (Academic Press 80, 1972) and Ray, et al. (Macromolecules, 10, 773, 1977).

Content of pentene-1 unit (mol %) =

-continued $$\frac{I\alpha\alpha + \frac{1}{2}I\alpha\gamma + \frac{1}{2}I\alpha\delta}{I\alpha\alpha + I\alpha\gamma + I\alpha\delta + \frac{1}{2}I\beta\delta + \frac{1}{2}I\gamma\delta + \frac{1}{2}I\delta\delta} \times 100$$

wherein
$I\alpha\alpha$ is a peak strength at 38.98 ppm,
$I\alpha\gamma$ is a peak strength at 34.72 ppm,
$I\alpha\delta$ is a peak strength at 34.47 ppm,
$I\beta\delta$ is a peak strength at 27.52 ppm,
$I\gamma\beta$ is a peak strength at 30.21 ppm,
$I\delta\delta$ is a peak strength at 29.96 ppm.

The content of constitution units derived from comonomers in the Examples and Comparative Examples are determined.

ESTIMATION OF STABILITY (1) Thermal stability in the molding stage

MFR of films: The film shows better thermal stability when the difference between the MFR of the pellets and that of the film is smaller.

Physical properties of films (Impact Strength): The film shows less deterioration in the molding stage when the film has a larger value of impact strength.

(2) Long-term heat stability

A film is aged at 100° C. in a gear oven, and a period of time from the start of aging to the time when the tensile elongation becomes ½ of that of the initial value is measured.

The film has better heat-resistant and aging-resistant properties when it shows a longer period of time.

(3) Weatherability

A film is irradiated with light for 500 hours by using a sunshine weatherometer at a discharge voltage of 50 V and a discharge current of 60 A, and with rain, and a retention of tensile elongation thereof is measured.

The film has better weatherability when it shows a larger retention of tensile elongation.

EXAMPLE 1

Preparation of titanium catalyst

A mixture of 714 g of anhydrous magnesium chloride, 3.7 l of decane and 3.5 l of 2-ethylhexyl alcohol was heated at 130° C. for 2 hours to prepare a homogeneous solution. To this solution was added 290 g of ethyl benzoate, and the mixture was stirred at 130° C. for 1 hour. The homogeneous solution thus obtained was cooled to room temperature, and the whole solution was added dropwise to 20 l of titanium tetrachloride kept at −20° C. over a period of 1 hour. After completion of the addition, the temperature of the mixture was elevated to 80° C. over a period of 2 hours, and the mixture was held with stirring at that temperature for 2 hours. After completion of the 2-hour reaction, the resulting solid was collected by hot filtration and suspended in 28 l of TiCl₄, followed by reaction at 90° C. for 2 hours. After completion of the reaction, the solid was collected by hot filtration, and was thoroughly washed with decane kept at 90° C. and hexane kept at room temperature until no free titanium compound was detected in the washing liquid to obtain a titanium catalyst component. The titanium catalyst component contained 4.8% by weight of titanium, 52% by weight of chlorine, 16% by weight of magnesium and 6.2% by weight of ethyl benzoate.

Pre-polymerization

Into a 20-liter reactor equipped with a stirrer, were introduced 10 liter of hexane, 300 mmoles of triethylaluminum and 100 mmoles in terms of titanium atom of the titanium catalyst component obtained above in an atmosphere of nitrogen. Into the mixture in the reactor was fed propylene at a rate of 100 g/hr for 3 hours. During that operation, the temperature in the reactor was kept at 20° C. After three hours from the initiation of feeding the propylene, the propylene supply was stopped, and nitrogen was fed into the reactor to purge with nitrogen. Stirring the reaction mixture was stopped, and the mixture was allowed to stand, followed by removal of the supernatant. The solid left was washed three times with purified hexane.

Polymerization

Figure 3:
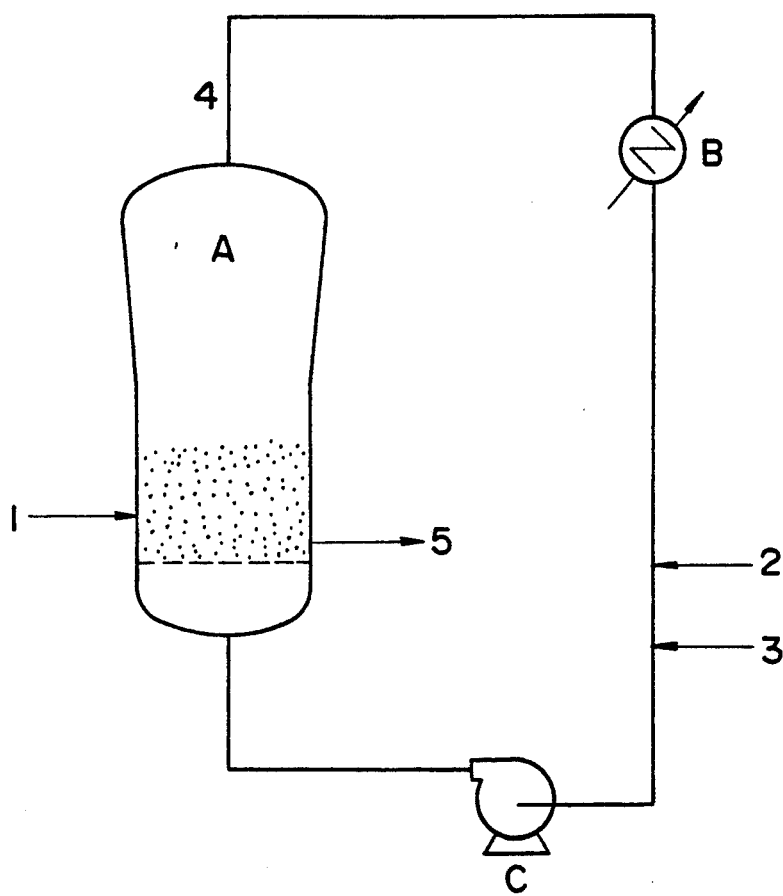
FIG. 3 is a rough sectional view of the polymerization vessel used in the embodiment of the present invention.

To a polymerizer having a diameter of 40 cm Φ and a capacity of 400 l as shown in FIG. 3 were fed continuously through a pipe 1 the above-mentioned pre-polymerized catalyst at a rate of 0.5 mmol/h in terms of Ti atom and triisobutylaluminum at a rate of 25 mmol/h. Simultaneously, into the polymerizer were fed through a pipe 2 ethylene at a rate of 9.4 kg/h and 1-pentene at a rate of 3.1 kg/h, and through a pipe 3 hydrogen in such a proportion that the H₂/ethylene molar ratio in the polymerizer is maintained at 0.10.

The polymerization conditions employed were such that the pressure is 18 kg/cm² G, the polymerization temperature is 80° C., the residence time is 4 hours, and the linear velocity of the circulating gas in the vapor phase polymerizer is maintained at a rate of 45 cm/sec. The circulating gas from a pipe 4 passed through a condenser B and circulated in the polymerizer through a fan C.

The resulting copolymer was discharged at a rate of 4.7 kg/hr out of the system through a pipe 5. The thus obtained copolymer had a density of 0.924 g/cm³ and MFR of 1.1 g/10 min.

Preparation of composition

To the copolymer obtained above were added Irganox 1076, a product of Ciba-Geigy (0.20% by weight), calcium stearate (0.10% by weight) and silica (0.10% by weight), and the resulting mixture was granulated.

Molding of film

Using a commercially available T-die film forming machine equipped with an extruder having diameter of 65 mm, the copolymers was molded into a sheet of 420 mm in width and 0.04 mm in thickness.

The molding was carried out in such condition that the resin temperature was 235° C., the revolution of a screw of the extruder was 40 rpm, the chill roll temperature was 35° C., the film forming speed was 20 m/min, and a draft ratio was 0.057.

Physical properties of the films obtained were as shown in Table 2.

EXAMPLE 2 AND COMPARATIVE EXAMPLES 1 AND 2

The copolymerization of Example 1 was repeated except that modified conditions as shown in Table 1 were employed to obtain copolymers respectively shown in Table 2.

In Table 2, the impact strength was determined in accordance with JIS P8134, as previously described, and the tear strength was determined in accordance with JIS Z-1702, which states in pertinent part:

JAPANESE INDUSTRIAL STANDARD  J I S

Polyethylene Films for Packaging   Z 1702-1986

1. Scope

This Japanese Industrial Standard specifies the polyethylene films, hereinafter referred to as the "films", for packaging.

Remark: The units and numerical values given in { } in this standard are in accordance with the conventional units, and are the values specified as this standard.

2. Classes

The films shall be classified into 4 classes as shown in Table 1 according to the properties and quality.

TABLE 1

| Class | Characteristics |
| --- | --- |
| Class 1 A | Comparatively flexible |
| Class 1 B | Comparatively flexible, especially resistant to shock |
| Class 2 A | Comparatively rigid |
| Class 2 B | Comparatively rigid, for ultra-thin film or for reinforcement purpose |

3. Quality

The film shall be homogeneous and free from harmful defects in use such as bubbles, uneveness, wrinkle, fish eye, mixture of foreign substances, pin holes and the like, and meet the specifications as shown in Table 2, when tested in accordance with 7.

TABLE 2

| Test item | Quality | | | | Applicable item |
| --- | --- | --- | --- | --- | --- |
| | Class 1 A | Class 1 B | Class 2 A | Class 2 B | |
| Tensile strength MPa {kgf/cm$^2$} | 11.8 {120} min. | 16.7 {170} min. | 19.6 {200} min. | 29.4 {300} min. | 7.5 |
| Elongation % | 150 min. | 250 min. | 150 min. | 150($^1$) min. | 7.5 |
| Impact test | — | To meet the requirements | — | To meet the requirements | 7.6 |

Note ($^1$)Elongation shall be not less than 50% for nominal thickness of 0.010 mm, and not less than 100% for nominal thickness of 0.015 mm.

4. Shape

The section of film perpendicular to the direction of forming work shall be a tubular or a filmy shape.

5. Dimensions 5.1 Thickness  The nominal thickness of films shall be as specified in Table 3, and the film thickness, ratio of the difference between the nominal and average thickness to the nominal thickness, and the difference of the thickness from the nominal thickness shall conform to the requirements of Table 3, when tested in accordance with 7.3.

TABLE 3

Unit: mm

| Nominal thickness $t_0$ | Tolerance of the ratio of difference of average thickness $\Delta t$ (%) | Permissible range of the difference of thickness $\Delta t$ |
| --- | --- | --- |
| 0.010 | +15 / −10 | +0.004 / −0.003 |
| 0.015 | | +0.005 / −0.004 |
| 0.020 | ±9 | ±0.006 |
| 0.025 | | ±0.006 |
| 0.030 | | ±0.007 |
| 0.035 | | ±0.007 |
| 0.040 | | ±0.008 |
| 0.045 | | ±0.008 |
| 0.050 | ±7 | ±0.009 |
| 0.060 | | ±0.010 |
| 0.070 | | ±0.011 |
| 0.080 | | ±0.012 |
| 0.090 | | ±0.013 |
| 0.100 | | ±0.013 |

Remark: For the films of nominal thickness of 0.010 mm and 0.015 mm, this table shall be applied only to Class 2 B.

5.2 Lay-Flat Width or Width and Length  The lay-flat width($^2$) or width and length shall be as specified in Table 4 and their tolerances shall conform to the requirements of Table 5 when tested in accordance with 7.4.

Note ($^2$) The lay-flat width is a tube width which is wound, laid flat, in the inflation method.

TABLE 4

| Lay-flat width or width mm | | |
| --- | --- | --- |
| Range of nominal dimension | Interval of nominal dimension | Length m |
| 70 to 500 | 10 | As agreed between the parties concerned |
| 500 to 1000 | 20 and 50 | |
| 1000 min. | 50 | |

TABLE 5

Unit: mm

| Lay-flat width or width | Tolerances on lay-flat width or width | Tolerances on length |
| --- | --- | --- |
| 70 to 100 | ±2 | Minus side is not allowed. |
| 110 to 200 | ±3 | |
| 210 to 300 | ±4 | |
| 310 to 400 | ±5 | |
| 410 to 500 | ±6 | |
| 520 to 800 | ±7 | |
| 820 to 1000 | ±10 | |
| 1050 min. | ±1.2(%) | |

6. Material and Manufacturing Method

The film shall be formed in film by the inflation or T-die method using, as the primary constituent, the material specified in JIS K 6748 or JIS K 6731.

7. Test Methods 7.1 Sampling Method  Cut off lengthwise three samples with a length of not less than 1 m (sufficient quantity to take each test piece) from the test film.

Remark: Length and Width of Film  Regarding the length and width, the direction parallel to the flow of forming work is referred to as the vertical direction and the direction perpendicular to that flow is referred to as the horizontal direction.

7.2 Pre-Treatment of Sample and Test Conditions  The test conditions of film and the pre-treatment conditions of the sample or the test piece shall be, in principle, the standard temperature condition Grade 2 (23°±2° C.) specified in JIS K 7100. The pre-treatment period shall be not less than 1 h.

7.3 Measuring Method for Thickness (1) Thickness Gauge A thickness gauge as specified in JIS B 7509, in which the gauge head of spindle has a smooth flat plane of 5°±0.01 mm in diameter and the anvil has a smooth flat surface of not less than 30 mm in diameter being arranged perpendicular to the spindle, shall be used. The dial shall be not less than 50 mm in diameter and shall have a scale capable of reading to 0.001 mm. In this case, a thickness gauge having a pressing load of 1226±147 mN {125±15 gf} shall be used.

(2) Procedure Measure the thickness at 8 points distributed at almost equal intervals along a cut side of one of the samples cut off in accordance with 7.1. The measuring points shall be at least 5 mm inside from the cut side.

(3) Calculation Obtain the maximum, minimum and average thickness from whole measurements, and calculate the thickness difference from nominal thickness and the ratio of difference of average thickness from nominal thickness according to the following formula:

$$\Delta t = t_{max}(\text{or } t_{min}) - t_0$$

$$\Delta t = \frac{t - t_0}{t_0} \times 100$$

where
$t_{max}$: maximum thickness (measured value) (mm)
$t_{min}$: minimum thickness (measured value) (mm)
$t_0$: nominal thickness (mm)
$\Delta t$: thickness difference from nominal thickness (mm)
$\bar{t}$ average thickness (mm) (average of measured values)
$t + -t_0$: difference of average thickness (mm) (difference between average and nominal values)
$\Delta t+$: ratio of the difference of average thickness to nominal thickness (%)

7.4 Measuring Method for Lay-Flat Width or Width (1) Measuring Instrument The measuring instrument specified in JIS B 7516 or JIS B 7512 or that equal or superior in accuracy thereto shall be used.

(2) Procedure Measure at 3 points at almost equal intervals along the longitudinal direction of film of 3 samples cut in off accordance with 7.1, and obtain the average value.

7.5 Tensile Strength Test The tensile strength test shall be carried out as follows:

(1) Testing Machine A tensile testing machine of a constant crosshead speed type or pendulum type shall be used. The testing machine shall be provided with an indicating device and a gripping device for test piece, and its load indicating accuracy shall be within ±2%. The breaking load should be in a range of 15 to 85% of the machine capacity.

(2) Test Piece The test piece shall be of a strip form having a width of 15±0.1 mm, with its parallelism being within 0.1 mm, and a length enough long for carrying out the measurement (about 180 mm) or of a dumbell form
The number of test pieces shall be each not less than 5 for longitudinal and transversal directions of a sample.

(3) Procedure Mark 2 marked lines for elongation measurement on the surface of the test piece with ink or crayon having no harmful effect on the specimen.

The distance between the marked lines shall be 50±2 mm for a strip type and 40±2 mm for a dumbell type.
The measurement of the thickness of test piece shall be made at 3 points between the marked lines of each test piece and take the smallest value as the thickness.
The test piece shall be attached to a testing machine so as the distance between upper and lower grips is about 100 mm for a strip type test piece and 80±5 mm for dumbbell type test piece, and the centre of test piece coincides with the center of distance between grips.
The test speed shall be 500 mm±10% per minute, apply tensile load till the test piece breaks and obtain the maximum load during the test and the gauge length at breakage. If a slip is observed in the test piece during the test, however, the result shall be discarded, and in the case breakage occurred outside the marked line, the results shall also be discarded.

(4) Calculation The value of the maximum load till breakage divided by the initial sectional area shall be the tensile strength in MPa {kgf/cm²} and each average value for longitudinal and lateral directions shall be obtained to 3 significant figures.
The elongation shall be calculated from the following formula and each average value for longitudinal and lateral directions be obtained to 2 significant figures. The specified values for tensile strength and elongation in Table 2 shall be the average values in the direction in which the values are lower than those of the other.

$$l = \frac{L - L_0}{L_0} \times 100$$

where
$l$: elongation (%)
$L$: gauge length at breakage (mm)
$L_0$: gauge length before test (mm)

7.6 Impact Test The impact test shall be as shown below:

(1) Testing Apparatus The testing apparatus shall comprise a test piece holder, dart detacher, dart, weight, etc.
   (a) The test-piece holder shall be of such structure that it is able to fix the test piece horizontally, has a circular portion of 125±2 mm in inner diameter, and is able to accept the impact due to the fall of dart. A test piece holder which is able to pneumatically fix the test piece is desirable.
   (b) The dart detacher shall be so constructed that it holds the dart at a specified height from the test piece and is able to let fall the dart on the middle part of test piece.
   (c) The dart shall have a shaft of 6.4 mm in diameter and not less than 115 mm in length to which a semi-spherical weight (added weight) of aluminium or phenol resin having a diameter of 38±1 mm can be attached, and its mass shall be about 30 g.
   (d) The weight shall be added to the dart so as to obtain a test mass[3] given in Table 6 with an accuracy of ±0.5%. It is composed of a stainless steel or brass cylinder of 30 mm in diameter with a hole of 6.5 mm in diameter at the centre, and is able to be adjusted in its thickness to attain the specified test mass.

Note (³) The test mass means the whole mass obtained by adding necessary weights to the dart specified in 7.6 (1) (c).

(2) Test Piece
  (a) The test piece shall be not less than 150 mm in length and width or not less than 150 mm in diameter.
  (b) The test piece shall be free from pinholes, wrinkles, folds, and other obvious defects.
  (c) The number of test pieces shall be 10.

(3) Procedure After having confirmed that the dart will fall at the middle of the test piece, attach the test piece to the test piece holder. Attach the dart to the dart detacher, adjust the height of the tip of dart from the test piece surface to 660±4 mm, and hold. Then, carry out the test on 10 test pieces with the test mass specified in Table 6, and ascertain that not less than half the test pieces remain without breaking. In this test, care shall be taken so that the dart does not give impact twice to the test piece.

(5) Name of manufacturer or its abbreviation

TABLE 1

| | Comonomer | Amount of comonomer fed (kg/h) | $H_2$/ethylene molar ratio |
|---|---|---|---|
| Example 2 | 1-Pentene | 3.5 | 0.15 |
| Comparative Example 1 | 1-Butene | 4.3 | 0.18 |
| Comparative Example 2 | 1-Hexene | 3.1 | 0.19 |

TABLE 2

| Run | Comonomer | MFR (g/10 min) | Density (g/cm³) | Impact strength of film (kg/cm) | Tear strength MD/TD (kg/cm) | RS | Content of Comonomer unit Wt % (mol %) |
|---|---|---|---|---|---|---|---|
| Example 1 | 1-Pentene | 1.1 | 0.923 | 2300 | 55/140 | 42 | 8(3.4) |
| Example 2 | 1-Pentene | 1.1 | 0.916 | 4500 | 65/150 | 69 | 12(5.2) |
| Comparative Example 1 | 1-Butene | 1.1 | 0.923 | 700 | 30/90 | 23 | 8(4.2) |
| Comparative Example 2 | 1-Hexene | 1.0 | 0.924 | 2300 | 80/210 | 29 | 7(2.5) |

TABLE 6

| Nominal thickness mm | Test mass g Class 1 B | Test mass g Class 2 B |
|---|---|---|
| 0.010 | — | 60 |
| 0.015 | — | 70 |
| 0.020 | 50 | 90 |
| 0.025 | 60 | 100 |
| 0.030 | 70 | 120 |
| 0.035 | 80 | 130 |
| 0.040 | 90 | 150 |
| 0.045 | 95 | 160 |
| 0.050 | 100 | 180 |
| 0.060 | 120 | 210 |
| 0.070 | 140 | 240 |
| 0.080 | 160 | 270 |
| 0.090 | 180 | 300 |
| 0.100 | 200 | 330 |

8. Inspection

The inspection of the film shall be carried out according to the test specified in 7. and shall conform to 3. and 5.

8.1 The inspection items shall be appearance, dimensions, tensile strength, elongation, and impact test.

8.2 The inspection shall be carried out according to an inspection method designed reasonably.

9. Marking

The film shall be packaged so as not to be injured, and be marked with following information on a conspicuous place of each package.
(1) Name
(2) Class
(3) Dimension
(4) Year and month of manufacture or its abbreviation

EXAMPLE 3

A mixture of 119 g of a commercially available anhydrous magnesium chloride, 579 ml of 2-ethylhexyl alcohol and 5.6 l of decane was heated at 140° C. for 3 hours to prepare a homogeneous solution containing magnesium chloride.

To this solution was added 70 ml of propionic acid, and the solution was heated at 70° C. for 1 hour, followed by cooling. To this solution was added dropwise with stirring at 20° C. a mixture of 178 ml of triethylaluminum and 1.1 l of decane over a period of 30 minutes, and the temperature was then elevated to 80° C. over a period of 1 hour, followed by maintaining the mixture at 80° C. for 1 hour to carry the reaction. To the mixture was then added dropwise a mixture of 89 ml of triethylaluminum and 560 ml of decane over a period of 30 minutes, followed by heating at that temperature for 30 minutes. Thereafter, to the mixture was added dropwise a mixture of 189 ml of diethylaluminum chloride and 1.3 l of decane over a period of 30 minutes, followed by heating at 80° C. for 1 hour.

Subsequently, the resulting solid was removed by filtration to prepare a solid component.

To a suspension of the thus obtain solid component in 5 l of decane was added 188 mmoles of 2-ethylhexoxytitanium trichloride and the mixture was heated at 80° C. for 1 hour. The solid component was then separated and washed with decane to prepare a solid titanium catalyst component. Separately, a portion collected from the slurry obtained by heating at 80° C. for 1 hour, of which the decane had been removed and then replaced with hexane was then dried to obtain a dried catalyst component. It was confirmed on analysis of the dried catalyst component, that the solid titanium catalyst component obtained above contained 1.3% by weight of titanium, 12% by weight of magnesium and 36% by weight of chlorine.

Pre-polymerization

A 200-liter nitrogen purged reactor equipped with a stirrer was charged with 100 l of hexane, 1.5 moles of triethylaluminum and 0.5 mole in terms of titanium atom of the solid titanium catalyst component obtained above. To the mixture in the reactor was fed ethylene gas at a rate of 5 kg/hr for four hours. During this operation, the system of the reactor was maintained at 30° C. After four hours from the initiation of feeding ethylene gas, the ethylene gas feeding was stopped, and nitrogen was fed to the reactor to purge the ethylene gas therefrom. After the stirrer was stopped and the mixture was allowed to stand, the supernatant of said mixture was removed therefrom, and the solid left was washed three times with purified hexane.

Polymerization

To a polymerizer having a diameter of 40 cm Φ and a capacity of 400 l as shown in FIG. 3 were fed continuously through a pipe 1 a suspension of the pre-polymerized catalyst component obtained above at a rate of 0.17 mmol/h in terms of Ti atom and triisobutylaluminum at a rate of 2.5 mmol/h and simultaneously were fed through a pipe 2 ethylene at a rate of 9.5 kg/h and 1-pentene at a rate of 2.9 kg/h and through a pipe 3 was fed hydrogen in such an amount that H$_2$/ethylene molar ratio in the polymerizer become 0.10.

The polymerization conditions employed were such that the pressure is 18 kg/cm$^2$ G, the polymerization temperature is 80° C., the residence time is 4 hours, and the linear velocity of the circulating gas in the vapor phase polymerizer is maintained at a rate of 45 cm/sec. The circulating gas from a pipe 4 passed through a condenser B and circulated to the polymerizer through a fan C.

The resulting copolymer was discharged through a pipe 5 outside the system at a rate of 4.7 kg/Hr. The thus obtained copolymer had a density of 0.923 g/cm$^3$ and MFR of 1.1 g/10 min.

Preparation of composition

The composition was prepared from the copolymer obtained above in the same procedure as in Example 1.

Molding of film

The film was prepared from the copolymer obtained above in the same procedure as in Example 1.

Physical properties of the film obtained are shown in Table 4.

EXAMPLE 4 AND COMPARATIVE EXAMPLES 3 AND 4

The copolymerization of Example 3 was repeated but employing modified conditions as shown in Table 3 to obtain copolymers respectively shown in Table 4.

Physical properties of the films obtained from the copolymers were as shown in Table 4.

TABLE 3

| | Comonomer | Amount of comonomer fed (kg/h) | H$_2$/ethylene molar ratio |
|---|---|---|---|
| Example 4 | 1-Pentene | 3.6 | 0.17 |
| Comparative Example 3 | 1-Butene | 3.7 | 0.16 |
| Comparative Example 4 | 1-Hexene | 2.8 | 0.17 |

TABLE 4

| Run | Comonomer | MFR (g/10 min) | Density (g/cm$^3$) | Impact strength of film (kg/cm) | Tear strength MD/TD (kg/cm) | RS | Hh/H1 | Content of Comonomer unit Wt % (mol %) |
|---|---|---|---|---|---|---|---|---|
| Example 3 | 1-Pentene | 1.1 | 0.923 | 2500 | 60/145 | 42 | 4.3 | 8(3.4) |
| Example 4 | 1-Pentene | 1.2 | 0.915 | 4900 | 65/155 | 75 | 3.3 | 12(5.2) |
| Comparative Example 3 | 1-Butene | 1.0 | 0.925 | 800 | 35/95 | 23 | 2.8 | 7(3.6) |
| Comparative Example 4 | 1-Hexene | 1.1 | 0.923 | 2600 | 85/220 | 31 | 5.0 | 8(2.8) |

EXAMPLE 5

Using a 250-liter polymerizer, ethylene and 1-pentene, both suspended in hexane, were copolymerized continuously in the presence of the pre-polymerized catalyst and a mixture (1/1 molar ratio) of triethylaluminum and diethylaluminum chloride.

The polymerization conditions employed and the results of polymerization obtained were as shown in Table 5, and the results of evaluation of the films obtained therefrom were as shown in Table 6.

COMPARATIVE EXAMPLES 5 AND 6

The copolymerization of Example 5 was repeated but employing modified conditions as shown in Table 5 to obtain copolymers respectively shown in Table 6.

The results of evaluation of the films obtained from the copolymers were as shown in Table 6.

TABLE 5

| | Comonomer | Polymerization Pressure (kg/cm$^2$G) | Ti concn. (mM/l) | Amount of ethylene fed (kg/h) | Amount of comonomer fed (kg/h) | H$_2$/ethylene molar ratio | Residence time (hr) | Polymerization activity (g-PE/mM-Ti) | Density (g/cm$^3$) | MFR (g/10 min.) |
|---|---|---|---|---|---|---|---|---|---|---|
| Ex. 5 | 1-Pentene | 4.2 | 0.027 | 10 | 3.1 | 0.52 | 2.2 | 10,600 | 0.930 | 1.22 |
| Comp. Ex. 5 | 1-Hexene | 4.5 | 0.023 | 9 | 9 | 0.51 | 2.0 | 9,200 | 0.930 | 1.35 |
| Comp. Ex. 6 | 1-Butene | 3.7 | 0.032 | 12 | 1.4 | 0.54 | 2.5 | 12,600 | 0.929 | 1.25 |

The polymerization temperature: 70° C., Al/Ti molar ratio at the time of polymerization: 10, and the slurry concentration at the time of polymerization: 250 g-polymer/l.

TABLE 6

| Run | Comonomer | MFR (g/10 min) | Density (g/cm³) | Impact strength of film (kg/cm) | Tear strength MD/TD (kg/cm) | RS | Content of Comonomer unit Wt % (mol %) |
|---|---|---|---|---|---|---|---|
| Example 5 | 1-Pentene | 1.22 | 0.930 | 1600 | 30/65 | 53 | 5(2.1) |
| Comparative Example 5 | 1-Hexenee | 1.35 | 0.930 | 1600 | 85/100 | 19 | 2(1.0) |
| Comparative Example 6 | 1-Butene | 1.25 | 0.929 | 600 | 25/60 | 24 | 6(3.1) |

EXAMPLE 6

To a polymerizer having a diameter of 40 cm φ and a capacity of 400 l shown in FIG. 3 were fed continuously through a pipe 1 the pre-polymerized catalyst prepared in Example 1 suspended in hexane and triisobutylaluminum, at a rate of 0.5 mmol/hr in terms of Ti atom and a rate of 25 mmol/hr, respectively, and simultaneously were fed through a pipe 2 ethylene at a rate of 9.3 kg/hr and 1-pentene at a rate of 3.4 kg/hr, and was fed through a pipe 3 hydrogen in such an amount that $H_2$/ethylene molar ratio in the polymerizer becomes 0.14.

The polymerization conditions employed were such that the pressure is 18 kg/cm² G, the polymerization temperature is 80° C., the residence times is 4 hours, and the linear velocity of the circulating gas in the vapor phase polymerizer is maintained at a rate of 45 cm/sec. The circulating gas from a pipe 4 passed through a condenser B and circulated to the polymerizer through a fan C.

The resulting copolymer was discharged through a pipe 5 out of the system at a rate of 4.5 kg/hr. The thus obtained copolymer had a density of 0.921 g/cm³ and MFR of 2.2 g/10 min.

The copolymer was pelletized at a temperature of 200° C. by means of an extruder having a screw diameter of 45 mm φ.

The pellets obtained were formed by means of a commercially available T-die film forming machine equipped with an extruder of 65 mm φ into a film of 420 mm in width and 0.04 mm in thickness. At the time of film forming, the resin temperature was 235° C., the film forming speed was 20 m/min, and a draft ratio was 0.057.

MFR, impact strength, resistance to heat aging and weathering resistance of the film obtained were evaluated. Results obtained were as shown in Table 8.

EXAMPLES 7-30

The same film forming operation as in Example 6 was repeated except but using the pellets obtained respectively by pelletizing the copolymer obtained in Example 6 to which each of various stabilizers as shown in Table 7 has been added in an amount shown in Table 7. Results obtained are shown in Table 8.

TABLE 7

| Example | A | B | C | D | E | F | G | H | I | J | K | L | M |
|---|---|---|---|---|---|---|---|---|---|---|---|---|---|
| 6 | — | — | — | — | — | — | — | — | — | — | — | — | — |
| 7 | 0.10 | | | | | | | | | | | | |
| 8 | 0.10 | | | | | | | | | 0.10 | | | |
| 9 | — | 0.10 | | | | | | | | 0.10 | | | |
| 10 | 0.10 | | 0.10 | | | | | | | 0.10 | | | |
| 11 | 0.10 | | | 0.10 | | | | | | 0.10 | | | |
| 12 | 0.10 | | | | 0.10 | | | | | 0.10 | | | |
| 13 | 0.10 | | | | | | | 0.10 | | 0.10 | | | |
| 14 | | | 0.10 | | | | | | | | | | |
| 15 | | | 0.10 | | | | | | | 0.10 | | | |
| 16 | | | 0.10 | | | | | | | 0.10 | | | |
| 17 | | | 0.10 | 0.10 | | | | | | 0.10 | | | |
| 18 | | | 0.10 | | | | | 0.10 | | 0.10 | | | |
| 19 | | | | | 0.10 | | | | | | | | |
| 20 | | | | | 0.10 | | | | | 0.10 | | | |
| 21 | | | | | | | 0.10 | | | 0.10 | | | |
| 22 | | | | | | | | 0.10 | | 0.10 | | | |
| 23 | | | | | 0.10 | | | 0.10 | | 0.10 | | | |
| 24 | | | | | | | | 0.10 | | | | • | |
| 25 | | | | | | | | 0.10 | | 0.10 | | | |
| 26 | | | | | | | | | 0.10 | 0.10 | | | |
| 27 | | | | | | | | | | 0.10 | | | |
| 28 | | | | | | | | | | | 0.10 | | |
| 29 | | | | | | | | | | | | 0.10 | |
| 30 | | | | | | | | | | | | | 0.10 |

TABLE 8

| Example | MFR Pellet | MFR Film | Impact strength (kg · cm/cm) | Resistance to heat aging (day) | Weathering resistance (%) |
|---|---|---|---|---|---|
| 6 | 1.6 | 1.2 | 2500 | 17 | 10 |
| 7 | 2.1 | 2.0 | 3000 | 200 | 35 |
| 8 | 2.1 | 2.0 | 3000 | 220 | 40 |
| 9 | 2.1 | 2.0 | 3100 | 350 | 40 |
| 10 | 2.2 | 2.1 | 3100 | 250 | 50 |
| 11 | 2.2 | 2.1 | 3100 | 260 | 45 |
| 12 | 2.1 | 2.0 | 3100 | 330 | 40 |
| 13 | 2.1 | 2.0 | 3000 | 290 | 90 |
| 14 | 2.0 | 1.9 | 3000 | 80 | 30 |

TABLE 8-continued

| Example | MFR Pellet | MFR Film | Impact strength (kg·cm/cm) | Resistance to heat aging (day) | Weathering resistance (%) |
|---|---|---|---|---|---|
| 15 | 2.1 | 2.0 | 3000 | 100 | 35 |
| 16 | 2.1 | 2.0 | 3000 | 120 | 35 |
| 17 | 2.1 | 2.0 | 3000 | 150 | 30 |
| 18 | 2.1 | 2.0 | 3000 | 200 | 70 |
| 19 | 1.9 | 1.6 | 2900 | 50 | 20 |
| 20 | 1.9 | 1.7 | 2900 | 60 | 25 |
| 21 | 1.8 | 1.6 | 2900 | 70 | 25 |
| 22 | 1.9 | 1.7 | 2900 | 90 | 30 |
| 23 | 1.9 | 1.7 | 2900 | 150 | 60 |
| 24 | 1.9 | 1.6 | 2800 | 140 | 55 |
| 25 | 1.9 | 1.7 | 2900 | 160 | 60 |
| 26 | 1.9 | 1.7 | 2900 | 250 | 70 |
| 27 | 1.7 | 1.5 | 2800 | 30 | 25 |
| 28 | 1.7 | 1.5 | 2800 | 35 | 30 |
| 29 | 1.7 | 1.5 | 2800 | 30 | 25 |
| 30 | 1.7 | 1.5 | 2800 | 30 | 30 |

What is claimed is:

1. An ethylene/pentene-1 copolymer which is obtained by copolymerization of ethylene and pentene-1 and fulfills the following requisites (A) to (E):

(A) a melt flow rate of the copolymer as measured according to ASTM D 1238E is 0.01–100 g/10 min, (B) a density of the copolymer as measured according to ASTM D 1505 is 0.87–0.96 g/cm$^3$, (C) the copolymer contains constitution units derived from pentene-1 in an amount of 1–25% by weight, and (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer, and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

2. An ethylene/pentene-1 copolymer obtained by copolymerizing at least ethylene and pentene-1 in the presence of an olefin polymerization catalyst formed from

[A] a solid titanium catalyst component containing magnesium, titanium, halogen and an electron donor as its essential ingredients obtained by bringing (i) a liquid magnesium compound having no reducing ability and (ii) a liquid titanium compound into contact, as they are, with each other in the presence of (iii) an electron donor having no active hydrogen, or by bringing said (i) and said (ii) into contact, as they are, with each other, followed by contact with said (iii), and

[B] an organic compound catalyst component of a metal belonging to the Groups I to III of the periodic table;

said ethylene/pentene-1 copolymer fulfilling the following requisites (A) to (E):

(A) a melt flow rate of the copolymer as measured according to ASTM D 1238E is 0.01–100 g/10 min, (B) a density of the copolymer as measured according to ASTM D 1505 is 0.87–0.96 g/cm$^3$, (C) the copolymer contains constitution units derived from pentene-1 in an amount of 1–25% by weight, and (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

3. An ethylene/pentene-1 copolymer obtained by vapor phase copolymerization of ethylene and pentene-1 satisfying the following requirements (A)–(E):

(A) a melt flow rate of the copolymer as measured according to ASTM D 1238E is 0.01–100 g/10 min, (B) a density of the copolymer as measured according to ASTM D 1505 is 0.88–0.95 g/cm$^3$, (C) the copolymer contains constitution units derived from pentene-1 in an amount of 2–25% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

4. An ethylene/pentene-1 copolymer obtained by vapor phase copolymerization of ethylene and pentene-1 in the presence of an olefin polymerization catalyst formed from a solid titanium catalyst component [A] for olefin polymerization obtained by reaction of a hydrocarbon-insoluble solid magnesium aluminum composite selected from ($A_1$) or ($A_2$) mentioned below and tetravalent titanium compound and containing at least titanium atoms in a low valent state in the proportion of more than 10% and having OR group in an amount of from 1 to 15 in terms of OR/Mg (weight ratio) and an organoaluminum compound catalyst component [B], said ($A_1$) representing a solid magnesium·aluminum composite having $R^1O$ group and $R^2$ group ($R^1$ and $R^2$ is each a hydrocarbon residue) obtained from a liquid magnesium compound formed from a mixture containing a magnesium compound and an electron donor or a liquid magnesium compound formed from a solution of a magnesium compound in hydrocarbon solvent, and said ($A_2$) representing a solid magnesium, aluminum composite containing $R^1O$ group and $R^3$ group ($R^3$ is a hydrocarbon residue) obtained by reaction of a solid magnesium compound (B) containing $R^1O$ group or $R^1OH$ group obtained from a liquid magnesium compound formed from a mixture containing a magnesium compound and an electron donor or a liquid magnesium compound formed from a solution of a magnesium compound in hydrocarbon solvent or the above-mentioned ($A_1$) with an organometallic compound (C) of a metal belonging to the group I through III of the periodic table;

said ethylene/pentene-1 copolymer satisfying the following requirements (A)–(E):

(A) a melt flow rate of the copolymer as measured according to ASTM D 1238E is 0.01–100 g/10 min, (B) a density of the copolymer as measured according to ASTM D 1505 is 0.88–0.95 g/cm$^3$, (C) the copolymer contains constitution units derived from pentene-1 in an amount of 2–25% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

5. An ethylene/pentene-1 copolymer obtained by suspension copolymerization of ethylene and pentene-1 satisfying the following requirements (A)–(E):

(A) a melt flow rate of the copolymer as measured according to ASTM D 1238E is 0.01–100 g/10 min, (B) a density of the copolymer as measured according to ASTM D 1505 is 0.90–0.96 g/cm$^3$, (C) the copolymer contains constitution units derived from pentene-1 in an amount of 2–15% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

6. An ethylene/pentene-1 copolymer obtained by suspension copolymerization of ethylene and pentene-1 in the presence of an olefin polymerization catalyst formed from a solid titanium catalyst component [A] for olefin polymerization obtained by reaction of a hydrocarbon-insoluble solid magnesium aluminum composite selected from ($A_1$) or ($A_2$) mentioned below and a tetravalent titanium compound and containing at least titanium atoms in a low valent state in the proportion of more than 10% and having OR group in an amount of from 1 to 15 in terms of OR/Mg (weight ratio) and an organoaluminum compound catalyst component [B], said ($A_1$) representing a solid magnesium·aluminum composite having $R^1O$ group and $R^2$ group ($R^1$ and $R^2$ is each a hydrocarbon residue) obtained from a liquid magnesium compound formed from a mixture containing a magnesium compound and an electron donor or a liquid magnesium compound formed from a solution of a magnesium compound in hydrocarbon solvent, and said ($A_2$) representing a solid magnesium, aluminum composite containing $R^1O$ group and $R^3$ group ($R^3$ is a hydrocarbon residue) obtained by reaction of a solid magnesium compound (B) containing $R^1O$ group or $R^1OH$ group obtained from a liquid magnesium compound formed from a mixture containing a magnesium compound and an electron donor or a liquid magnesium compound formed from a solution of a magnesium compound in hydrocarbon solvent or the above-mentioned ($A_1$) with an organometallic compound (C) of a metal belonging to the group I through III of the periodic table;

wherein the polymerization is carried out at a state where more than 30% by weight of the resulting copolymer is not eluted and a polymerization temperature of 0°–120° C. to prepare, and said ethylene/pentene-1 copolymer satisfying the following requirements (A)–(E):

(A) a melt flow rate of the copolymer as measured according to ASTM D 1238E is 0.01–100 g/10 min, (B) a density of the copolymer as measured according to ASTM D 1505 is 0.90–0.96 g/cm$^3$, (C) the copolymer contains constitution units derived from pentene-1 in an amount of 2–15% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

7. A film formed from the ethylene/pentene-1 copolymer as claimed in any one of claims 1 to 6.

8. An ethylene/pentene-1 copolymer composition comprising an ethylene/pentene-1 copolymer (I) and at least one compound (II) selected from the group consisting of a phenolic stabilizer (a), an organic phosphite stabilizer (b), a thioether stabilizer (c), a hindered amine stabilizer (d) and a metal salt of a higher aliphatic acid (e);

said ethylene/pentene-1 copolymer (I) being obtained by copolymerization of ethylene and pentene-1 and fulfilling the following requisites (A) to (E):

(A) a melt flow rate of the copolymer as measured according to ASTM D 1238E is 0.01–100 g/10 min, (B) a density of the copolymer as measured according to ASTM D 1505 is 0.87–0.96 g/cm$^3$, (C) the copolymer contains constitution units derived from pentene-1 in an amount of 1–25% by weight, (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer, and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the same is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

9. The ethylene/pentene-1 copolymer composition as claimed in claim 8, wherein said composition comprises 100 parts by weight of the ethylene/pentene-1 copolymer (I) and 0.005–5 parts by weight of the phenolic stabilizer (a).

10. The ethylene/pentene-1 copolymer composition as claimed in claim 8, wherein said composition comprises 100 parts by weight of the ethylene/pentene-1 copolymer (I), 0.005–5 parts by weight of the phenolic stabilizer (a) and 0.005–5 parts by weight of at least one compound selected from the group consisting of the organic phosphite stabilizer (b), the thioether stabilizer (c), the hindered amine stabilizer (d) and the metal salt of a higher aliphatic acid (e).

11. The ethylene/pentene-1 copolymer composition as claimed in claim 8, wherein said composition comprises 100 parts by weight of the ethylene/pentene-1 copolymer (I) and 0.005-5 parts by weight of the organic phosphite stabilizer (b).

12. The ethylene/pentene-1 copolymer composition as claimed in claim 8, wherein said composition comprises 100 parts by weight of the ethylene/pentene-1 copolymer (I), 0.005-5 parts by weight of the organic phosphite stabilizer (b) and 0.005-5 parts by weight of at least one compound selected from the group consisting of the thioether stabilizer (c), the hindered amine stabilizer (d) and the metal salt of a higher aliphatic acid (e).

13. The ethylene/pentene-1 copolymer composition as claimed in claim 8, wherein said composition comprises 100 parts by weight of the ethylene/pentene-1 copolymer (I) and 0.005-5 parts by weight of the thioether stabilizer (c).

14. The ethylene/pentene-1 copolymer composition as claimed in claim 8, wherein said composition comprises 100 parts by weight of the ethylene/pentene-1 copolymer (I), 0.005-5 parts by weight of the thioether stabilizer (c) and 0.005-5 parts by weight of at least one compound selected from the group consisting of the hindered amine stabilizer (d) and the metal salt of a higher aliphatic acid (e).

15. The ethylene/pentene-1 copolymer composition as claimed in claim 8, wherein said composition comprises 100 parts by weight of the ethylene/pentene-1 copolymer (I) and 0.005-5 parts by weight of the hindered amine stabilizer (d).

16. The ethylene/pentene-1 copolymer composition as claimed in claim 8, wherein said composition comprises 100 parts by weight of the ethylene/pentene-1 copolymer (I), 0.005-5 parts by weight of the hindered amine type stabilizer (d) and 0.005-5 parts by weight of the metal salt of a higher aliphatic acid (e).

17. The ethylene/pentene-1 copolymer composition as claimed in claim 8, wherein said composition comprises 100 parts by weight of the ethylene/pentene-1 copolymer (I) and 0.005-5 parts by weight of the metal salt of a higher aliphatic acid (e).

18. An ethylene/pentene-1 copolymer composition comprising an ethylene/pentene-1 copolymer (Ia) and at least one compound (II) selected from the group consisting of a phenolic stabilizer (a), an organic phosphite stabilizer (b), a thioether stabilizer (c), a hindered amine stabilizer (d) and a metal salt of a higher aliphatic acid (e);

said ethylene/pentene-1 copolymer (Ia) being obtained by copolymerizing ethylene and pentene-1 in the presence of an olefin polymerization catalyst formed from (a) a solid titanium catalyst component containing magnesium, titanium, halogen and an electron donor as its essential ingredients obtained by bringing (i) a liquid magnesium compound having no reducing ability and (ii) a liquid titanium compound into contact, as they are, with each other in the presence of (iii) an electron donor having no active hydrogen, or by bringing said (i) and said (ii) into contact, as they are, with each other, followed by contact with said (iii), and (b) an organic compound catalyst component of a metal belonging to the Groups I to III of the periodic table;

said ethylene/pentene-1 copolymer fulfilling the following requisites (A) to (E):

(A) a melt flow rate of the copolymer as measured according to ASTM D 1238E is 0.01-100 g/10 min, (B) a density of the copolymer as measured according to ASTM D 1505 is 0.97-0.96 g/cm$^3$, (C) the copolymer contains constitution units derived from pentene-1 in an amount of 1-25% by weight, (D) in the case that said copolymer is subjected to cast molding to prepare a film having a thickness of 40 $\mu$m, a ratio (RS) of impact strength of the film in the take-off direction of the film satisfies the following formula:

$$RS \geq -20 \log MFR - 1000d + 968$$

wherein MFR represents a melt flow rate of said copolymer, and d represents a density of said copolymer, and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C., at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak temperature on the lower temperature side, and d represents a density of said copolymer.

19. The ethylene/pentene-1 copolymer composition as claimed in claim 18, wherein said composition comprises 100 parts by weight of the ethylene/pentene-1 copolymer (Ia) and 0.005-5 parts by weight of the phenolic stabilizer (a).

20. The ethylene/pentene-1 copolymer composition as claimed in claim 18, wherein said composition comprises 100 parts by weight of the ethylene/pentene-1 copolymer (Ia), 0.005-5 parts by weight of the phenolic stabilizer (a) and 0.005-5 parts by weight of at least one compound selected from the group consisting of the organic phosphite stabilizer (b), the thioether stabilizer (c), the hindered amine stabilizer (d) and the metal salt of a higher aliphatic acid (e).

21. The ethylene/pentene-1 copolymer composition as claimed in claim 18, wherein said composition comprises 100 parts by weight of the ethylene/pentene-1 copolymer (Ia) and 0.005-5 parts by weight of the organic phosphite stabilizer (b).

22. The ethylene/pentene-1 copolymer composition as claimed in claim 18, wherein said composition comprises 100 parts by weight of the ethylene/pentene-1 copolymer (Ia), 0.005-5 parts by weight of the organic phosphite stabilizer (b) and 0.005 to 5 parts by weight of at least one compound selected from the group consisting of the thioether stabilizer (c), the hindered amine stabilizer (d) and the metal salt of a higher aliphatic acid (e).

23. The ethylene/pentene-1 copolymer composition as claimed in claim 18, wherein said composition comprises 100 parts by weight of the ethylene/pentene-1 copolymer (Ia) and 0.005–5 parts by weight of the thioether stabilizer (c).

24. The ethylene/pentene-1 copolymer composition as claimed in claim 18, wherein said composition comprises 100 parts by weight of the ethylene/pentene-1 copolymer (Ia), 0.005–5 parts by weight of the thioether stabilizer (c) and 0.005–5 parts by weight of at least one compound selected from the group consisting of the hindered amine stabilizer (d) and the metal salt of a higher aliphatic acid (e).

25. The ethylene/pentene-1 copolymer composition as claimed in claim 18, wherein said composition comprises 100 parts by weight of the ethylene/pentene-1 copolymer (Ia) and 0.005–5 parts by weight of the hindered amine stabilizer (d).

26. The ethylene/pentene-1 copolymer composition as claimed in claim 18, wherein said composition comprises 100 parts by weight of the ethylene/pentene-1 copolymer (Ia), 0.005–5 parts by weight of the hindered amine stabilizer (d) and 0.005–5 parts by weight of the metal salt of a higher aliphatic acid (e).

27. The ethylene/pentene-1 copolymer composition as claimed in claim 18, wherein said composition comprises 100 parts by weight of the ethylene/pentene-1 copolymer (Ia) and 0.005–5 parts by weight of the metal salt of a higher aliphatic acid (e).

28. An ethylene/pentene-1 copolymer composition comprising an ethylene/pentene-1 copolymer (Ib) and at least one compound (II) selected from the group consisting of a phenolic stabilizer (a), an organic phosphite stabilizer (b), a thioether stabilizer (c), a hindered amine stabilizer (d) and a metal salt of a higher aliphatic acid (e);

said ethylene/pentene-1 copolymer (Ib) being obtained by vapor phase copolymerization of ethylene and pentene-1 in the presence of an olefin polymerization catalyst formed from a solid titanium catalyst component [A ]for olefin polymerization obtained by reaction of a hydrocarbon-insoluble solid magnesium aluminum composite selected from (A$_1$) or (A$_2$) mentioned below and a tetravalent titanium compound and containing at least titanium atoms in a low valent state in the proportion of more than 10% and having OR group in an amount of from 1 to 15 in terms of OR/Mg (weight ratio) and an organoaluminum compound catalyst component, said (A$_1$) representing a solid magnesium.aluminum composite having R$^1$O group and R$^2$ group (R$^1$ and R$^2$ is each a hydrocarbon residue) obtained from a liquid magnesium compound formed from a mixture containing a magnesium compound and an electron donor or a liquid magnesium compound formed from a solution of a magnesium compound in hydrocarbon solvent, and said (A$_2$) representing a solid magnesium, aluminum composite containing R$^1$O group and R$^3$ group (R$^3$ is a hydrocarbon residue) obtained by reaction of a solid magnesium compound (B) containing R$^1$O group or R$^1$OH group obtained from a mixture containing a magnesium compound and an electron donor or a liquid magnesium compound formed from a solution of a magnesium compound in hydrocarbon solvent or the above-mentioned (A$_1$) with an organometallic compound (C) of a metal belonging to the group I through III of the periodic table;

said ethylene/pentene-1 copolymer satisfying the following requirements (A)–(E):

(A) a melt flow rate of the copolymer as measured according to ASTM D 1238E is 0.01–100 g/10 min, (B) a density of the copolymer as measured according to ASTM D 1505 is 0.88–0.95 g/cm$^3$, (C) the copolymer contains constitution units derived from pentene-1 in an amount of 2–25% by weight (D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

29. The ethylene/pentene-1 copolymer composition as claimed in claim 28, wherein said composition comprises 100 parts by weight of the ethylene/pentene-1 copolymer (Ib) and 0.005–5 parts by weight of the phenolic stabilizer (a).

30. The ethylene/pentene-1 copolymer composition as claimed in claim 28, wherein said composition comprises 100 parts by weight of the ethylene/pentene-1 copolymer (Ib), 0.005–5 parts by weight of the phenolic stabilizer (a) and 0.005–5 parts by weight of at least one compound selected from the group consisting of the organic phosphite stabilizer (b), the thioether stabilizer (c), the hindered amine stabilizer (d) and the metal salt of a higher aliphatic acid (e).

31. The ethylene/pentene-1 copolymer composition as claimed in claim 28, wherein said composition comprises 100 parts by weight of the ethylene/pentene-1 copolymer (Ib) and 0.005–5 parts by weight of the organic phosphite stabilizer (b).

32. The ethylene/pentene-1 copolymer composition as claimed in claim 28, wherein said composition comprises 100 parts by weight of the ethylene/pentene-1 copolymer (Ib), 0.005–5 parts by weight of the organic phosphite stabilizer (b) and 0.005 to 5 parts by weight of at least one compound selected from the group consisting of the thioether stabilizer (c), the hindered amine stabilizer (d) and the metal salt of a higher aliphatic acid (e).

33. The ethylene/pentene-1 copolymer composition as claimed in claim 28, wherein said composition comprises 100 parts by weight of the ethylene/pentene-1 copolymer (Ib) and 0.005-5 parts by weight of the thioether stabilizer (c).

34. The ethylene/pentene-1 copolymer composition as claimed in claim 28, wherein said composition comprises 100 parts by weight of the ethylene/pentene-1 copolymer (Ib), 0.005-5 parts by weight of the thioether stabilizer (c) and 0.005-5 parts by weight of at least one compound selected from the group consisting of the hindered amine stabilizer (d) and the metal salt of a higher aliphatic acid (e).

35. The ethylene/pentene-1 copolymer composition as claimed in claim 28, wherein said composition comprises 100 parts by weight of the ethylene/pentene-1 copolymer (Ib) and 0.005-5 parts by weight of the hindered amine stabilizer (d).

36. The ethylene/pentene-1 copolymer composition as claimed in claim 28, wherein said composition comprises 100 parts by weight of the ethylene/pentene-1 copolymer (Ib), 0.005-5 parts by weight of the hindered amine stabilizer (d) and 0.005-5 parts by weight of the metal salt of a higher aliphatic acid (e).

37. The ethylene/pentene-1 copolymer composition as claimed in claim 28, wherein said composition comprises 100 parts by weight of the ethylene/pentene-1 copolymer (Ib) and 0.005-5 parts by weight of the metal salt of a higher aliphatic acid (e).

38. An ethylene/pentene-1 copolymer composition comprising an ethylene/pentene-1 copolymer (Ic) and at least one compound (II) selected from the group consisting of a phenolic stabilizer (a), an organic phosphite stabilizer (b), a thioether stabilizer (c), a hindered amine stabilizer (d) and a metal salt of a higher aliphatic acid (e);

said ethylene/pentene-1 copolymer (Ic) being obtained by suspension copolymerization of ethylene and pentene-1 in the presence of an olefin polymerization catalyst formed from a solid titanium catalyst component [A] for olefin polymerization obtained by reaction of a hydrocarbon-insoluble solid magnesium aluminum composite selected from $(A_1)$ or $(A_2)$ mentioned below and a tetravalent titanium compound and containing at least titanium atoms in a low valent state in the proportion of more than 10% and having OR group in an amount of from 1 to 15 in terms of OR/Mg (weight ratio) and an organoaluminum compound catalyst component, said $(A_1)$ representing a solid magnesium-aluminum composite having $R^1O$ group and $R^2$ group ($R^1$ and $R^2$ is each a hydrocarbon residue) obtained from a liquid magnesium compound formed from a mixture containing a magnesium compound and an electron donor or a liquid magnesium compound formed from a solution of a magnesium compound in hydrocarbon solvent, and said $(A_2)$ representing a solid magnesium, aluminum composite containing $R^1O$ group and $R^3$ group ($R^3$ is a hydrocarbon residue) obtained by reaction of a solid magnesium compound (B) containing $R^1O$ group or $R^1OH$ group obtained from a liquid magnesium compound formed from a mixture containing a magnesium compound and an electron donor or a liquid magnesium compound formed from a solution of a magnesium compound in hydrocarbon solvent or the above-mentioned $(A_1)$ with an organometallic compound (C) of a metal belonging to the group I through III of the periodic table;

wherein the polymerization is carried out at a state where more than 30% by weight of the resulting copolymer is not eluted and a polymerization temperature of 0°-120° C. to prepare, and said ethylene/pentene-1 copolymer satisfying the following requirements (A)-(E):

(A) a melt flow rate of the copolymer as measured according to ASTM D 1238E is 0.01-100 g/10 min, (B) a density of the copolymer as measured according to ASTM D 1505 is 0.90-0.96 g/cm$^3$, (C) the copolymer contains constitution units derived from pentene-1 in an amount of 2-15% by weight (D) in the case that said copolymer is subjected to cast molding to prepare a film having a thickness of 40 µm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$60d - 52.0 < Hh/Hl < 80d - 69.0$$

wherein Hh represents a peak height on the higher temperature side, Hl represents a peak height on the lower temperature side, and d represents a density of said copolymer.

39. The ethylene/pentene-1 copolymer composition as claimed in claim 38, wherein said composition comprises 100 parts by weight of the ethylene/pentene-1 copolymer (Ic) and 0.005-5 parts by weight of the phenolic stabilizer (a).

40. The ethylene/pentene-1 copolymer composition as claimed in claim 38, wherein said composition comprises 100 parts by weight of the ethylene/pentene-1 copolymer (Ic), 0.005-5 parts by weight of the phenolic stabilizer (a) and 0.005-5 parts by weight of at least one compound selected from the group consisting of the organic phosphite stabilizer (b), the thioether stabilizer (c), the hindered amine stabilizer (d) and the metal salt of a higher aliphatic acid (e).

41. The ethylene/pentene-1 copolymer composition as claimed in claim 38, wherein said composition comprises 100 parts by weight of the ethylene/pentene-1 copolymer (Ic) and 0.005-5 parts by weight of the organic phosphite stabilizer (b).

42. The ethylene/pentene-1 copolymer composition as claimed in claim 38, wherein said composition comprises 100 parts by weight of the ethylene/pentene-1 copolymer (Ic), 0.005-5 parts by weight of the organic phosphite stabilizer (b) and 0.005 to 5 parts by weight of at least one compound selected from the group consisting of the thioether stabilizer (c), the hindered amine stabilizer (d) and the metal salt of a higher aliphatic acid (e).

43. The ethylene/pentene-1 copolymer composition as claimed in claim 38, wherein said composition comprises 100 parts by weight of the ethylene/pentene-1 copolymer (Ic) and 0.005-5 parts by weight of the thioether stabilizer (c).

44. The ethylene/pentene-1 copolymer composition as claimed in claim 38, wherein said composition comprises 100 parts by weight of the ethylene/pentene-1 copolymer (Ic), 0.005-5 parts by weight of the thioether stabilizer (c) and 0.005-5 parts by weight of at least one compound selected from the group consisting of the hindered amine stabilizer (d) and the metal salt of a higher aliphatic acid (e).

45. The ethylene/pentene-1 copolymer composition as claimed in claim 38, wherein said composition comprises 100 parts by weight of the ethylene/pentene-1 copolymer (Ic) and 0.005-5 parts by weight of the hindered amine stabilizer (d).

46. The ethylene/pentene-1 copolymer composition as claimed in claim 38, wherein said composition comprises 100 parts by weight of the ethylene/pentene-1 copolymer (Ic), 0.005-5 parts by weight of the hindered amine stabilizer (d) and 0.005-5 parts by weight of the metal salt of a higher aliphatic acid (e).

47. The ethylene/pentene-1 copolymer composition as claimed in claim 38, wherein said composition comprises 100 parts by weight of the ethylene/pentene-1 copolymer (Ic) and 0.005-5 parts by weight of the metal salt of a higher aliphatic acid (e).

* * * * *